United States Patent
Katsuta et al.

(10) Patent No.: US 9,846,326 B2
(45) Date of Patent: Dec. 19, 2017

(54) LIGHT DIFFUSION MEMBER, METHOD FOR MANUFACTURING SAME, AND DISPLAY DEVICE

(71) Applicant: Sharp Kabushiki Kaisha, Osaka-shi, Osaka (JP)

(72) Inventors: Shohei Katsuta, Osaka (JP); Yasushi Asaoka, Osaka (JP); Toru Kanno, Osaka (JP); Hideomi Yui, Osaka (JP); Emi Yamamoto, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 48 days.

(21) Appl. No.: 14/903,140

(22) PCT Filed: Jul. 24, 2014

(86) PCT No.: PCT/JP2014/069549
§ 371 (c)(1),
(2) Date: Jan. 6, 2016

(87) PCT Pub. No.: WO2015/016127
PCT Pub. Date: Feb. 5, 2015

(65) Prior Publication Data
US 2016/0139454 A1 May 19, 2016

(30) Foreign Application Priority Data
Jul. 30, 2013 (JP) .................................. 2013-157793

(51) Int. Cl.
*G02F 1/1335* (2006.01)
*G02B 5/02* (2006.01)
(Continued)

(52) U.S. Cl.
CPC .......... *G02F 1/133504* (2013.01); *G02B 1/11* (2013.01); *G02B 5/0231* (2013.01);
(Continued)

(58) Field of Classification Search
CPC ......... G02F 1/133504; G02F 1/133606; G02B 5/02; G02B 6/005; G02B 6/0051;
(Continued)

(56) References Cited

U.S. PATENT DOCUMENTS

2006/0286395 A1* 12/2006 Goto ...................... B32B 27/36
428/480
2009/0046219 A1* 2/2009 Bell ................... B29D 11/0074
349/64
(Continued)

FOREIGN PATENT DOCUMENTS

JP 2007-286326 A 11/2007
JP 2009-294468 A 12/2009
(Continued)

OTHER PUBLICATIONS

Official Communication issued in International Patent Application No. PCT/JP2014/069549 dated Oct. 21, 2014.

*Primary Examiner* — Ricky Mack
*Assistant Examiner* — Kristina Deherrera
(74) *Attorney, Agent, or Firm* — Keating & Bennett, LLP

(57) ABSTRACT

A light diffusion member includes a substrate that has optical transparency, a light diffusion portion that is formed with a prescribed height on one surface of the substrate, a light shielding layer that is formed with a thickness less than the height of the light diffusion portion in another region of the one surface of the substrate than the light diffusion portion, and an antiglare layer that is formed on the other surface of the substrate. The light diffusion portion includes a light emission end surface that contacts with the substrate, a light incident end surface that faces the light emission end surface and has a larger area than an area of the light emission end surface, and a side surface that is formed between the light emission end surface and the light incident end surface, and
(Continued)

the antiglare layer includes a binder layer and plural light diffusion particles that are dispersedly arranged in the binder layer.

9 Claims, 10 Drawing Sheets

(51) Int. Cl.
    *G02B 1/11*     (2015.01)
    *G02B 5/22*     (2006.01)
    *F21V 8/00*     (2006.01)

(52) U.S. Cl.
    CPC ......... *G02B 5/0242* (2013.01); *G02B 5/0268* (2013.01); *G02B 5/0278* (2013.01); *G02B 5/0294* (2013.01); *G02B 5/226* (2013.01); *G02F 1/133502* (2013.01); *G02B 6/005* (2013.01); *G02B 6/0051* (2013.01); *G02F 1/133512* (2013.01); *G02F 1/133524* (2013.01); *G02F 2001/133562* (2013.01)

(58) Field of Classification Search
    CPC .... G02B 5/003; G02B 5/0205; G02B 5/0236; G02B 5/0278; G02B 5/22; G02B 5/223
    USPC ..... 359/599; 349/62, 64, 112; 362/244, 246, 362/317, 355, 558
    See application file for complete search history.

(56) References Cited

U.S. PATENT DOCUMENTS

2010/0188745 A1   7/2010   Endo et al.
2014/0111862 A1   4/2014   Yamamoto et al.

FOREIGN PATENT DOCUMENTS

| | | |
|---|---|---|
| JP | 2010-61112 A | 3/2010 |
| JP | 2012-118101 A | 6/2012 |
| WO | 2012/081410 A1 | 6/2012 |
| WO | 2012/157512 A1 | 11/2012 |

\* cited by examiner

FIG. 11
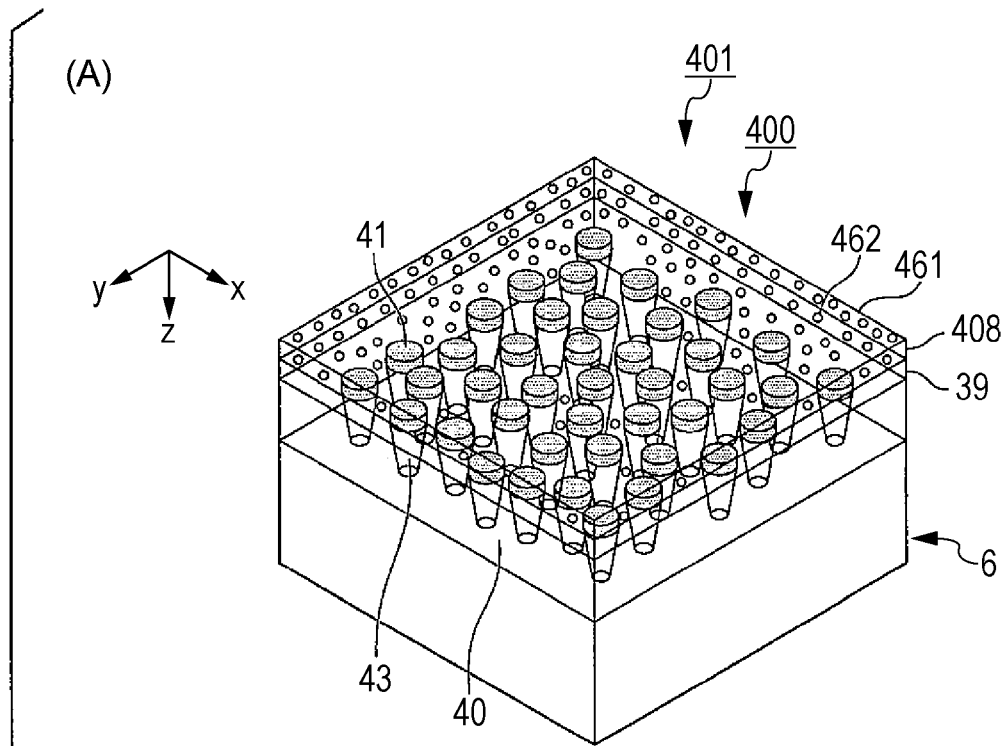
(A)
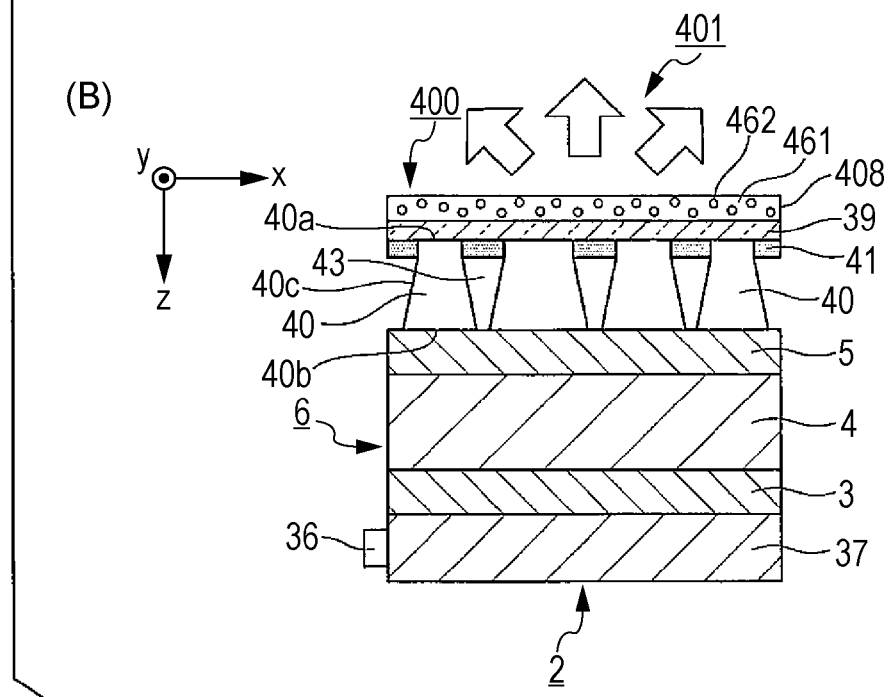
(B)

LIGHT DIFFUSION MEMBER, METHOD FOR MANUFACTURING SAME, AND DISPLAY DEVICE

TECHNICAL FIELD

The present invention relates to a light diffusion member, a method for manufacturing the same, and a display device.

This application claims priority from Japanese Patent Application No. 2013-157793 filed in Japan on Jul. 30, 2013, the disclosure of which is incorporated herein by reference.

BACKGROUND ART

Liquid crystal display devices have been widely used as displays of portable electronic apparatuses such as cellular phones, televisions, personal computers, and so forth, for example. Incidentally, the liquid crystal display device in general has characteristics that viewability from the front is high but the viewing angle is narrow. Thus, for the liquid crystal display device, various ideas have been suggested for widening the viewing angle in related art. One of the ideas is arranging a light diffusion member on a viewing side of a liquid crystal panel (display unit) and diffusing the light emitted from the viewing side of the liquid crystal panel by using the light diffusion member.

For example, PTL 1 discloses a light diffusion member that includes a transparent substrate, light diffusion portions that are formed on one surface of the transparent substrate and have a tapered side surface, and light shielding portions that are formed in regions other than the formation regions of the light diffusion portions on the one surface of the transparent substrate. The light diffusion portion is formed by patterning a transparent negative resist by irradiation with ultra-violet light (UV light) from the transparent substrate side and by causing the light shielding portion to function as a mask.

CITATION LIST

Patent Literature

PTL 1: International Publication No. 2012/081410

SUMMARY OF INVENTION

Technical Problem

Incidentally, in a light diffusion member, an antiglare layer is preferably formed on the surface of an opposite side of one surface of a transparent substrate in order to improve antiglare performance on the viewing side of a liquid crystal panel. Further, in a case where the light diffusion member is manufactured by a roll-to-roll (R to R) lamination method, the antiglare layer is preferably formed integrally with the transparent substrate prior to manufacturing of the light diffusion member.

However, in a case where the antiglare layer is integrally formed with the transparent substrate, the transparent negative resist is irradiated with the UV light diffused by the antiglare layer in the above-described procedure of pattering the light diffusion portion by irradiation with the UV light. Thus, the taper angle of a side surface that is provided to the light diffusion portion changes due to the difference in diffusion of the UV light by the antiglare layer.

For example, in a case where the diffusion angle of the UV light diffused by the antiglare layer is small, the taper angle of the side surface that is provided to the light diffusion portion becomes small. Further, in a case where the diffusion of the UV light in the plane of the antiglare layer is not uniform, the taper angle of the side surface that is provided to the light diffusion portion may become partially different. In such a case, the viewing angle characteristics of the light diffusion member attached to the liquid crystal panel may become non-uniform.

One aspect of the present invention has been suggested in consideration of such a circumstance in related art, and one object thereof is to provide a light diffusion member and a method for manufacturing the same that may maintain in-plane uniformity of a light diffusion function in a light diffusion member with an antiglare layer and a display device that includes the light diffusion member with such an antiglare layer.

Solution to Problem

To achieve the above object, measures described below are employed in the present invention.

(1) A light diffusion member in one aspect of the present invention includes: a substrate that has optical transparency; a light diffusion portion that is formed with a prescribed height on one surface of the substrate; a light shielding layer that is formed with a thickness less than the height of the light diffusion portion in another region of the one surface of the substrate than the light diffusion portion; and an antiglare layer that is formed on the other surface of the substrate, in which the light diffusion portion includes a light emission end surface that contacts with the substrate, a light incident end surface that faces the light emission end surface and has a larger area than an area of the light emission end surface, and a side surface that is formed between the light emission end surface and the light incident end surface, and the antiglare layer includes a binder layer and plural light diffusion particles that are dispersedly arranged in the binder layer.

(2) In the light diffusion member described in above (1), in a case where an average value of distances between centers of arbitrary neighboring light diffusion particles among the light diffusion particles is set as $D_{AVE}$, an average value of distances between centers of arbitrary neighboring light diffusion portions among the light diffusion portions is set as $d_{AVE}$, an angle that the side surface forms with respect to the light incident end surface is set as $\theta$, and a thickness of the substrate is set as T, the relationship of $D_{AVE} - 2T/\tan\theta \leq d_{AVE}$ is preferably satisfied.

(3) In the light diffusion member described in above (1) or (2), the light diffusion particles may be configured to be arranged in a state where the light diffusion particles are partially exposed from a surface of the binder layer.

(4) In the light diffusion member described in above (1) or (2), the light diffusion particles may be configured to be arranged in a state where the light diffusion particles are embedded on an inside of the binder layer.

(5) The light diffusion member described in any one of above (1) to (4) may include a structure in which the substrate includes one substrate that configures the one surface and the other substrate that configures the other surface and the one substrate and the other substrate are attached together via an adhesion layer.

(6) The light diffusion member described in any one of above (1) to (5) may include a structure in which the light diffusion portions are separately arranged in plural regions in a region where the light shielding layer is formed.

(7) The light diffusion member described in any one of above (1) to (5) may include a structure in which the light shielding layers are separately arranged in plural regions in a region where the light diffusion portion is formed.

(8) A method for manufacturing a light diffusion member in one aspect of the present invention includes: a step of fabricating an intermediate body of a light diffusion member in which a light shielding layer that is patterned into a prescribed shape and a photosensitive resin layer that covers a surface on which the light shielding layer is formed are formed on one surface of a substrate that has optical transparency and an antiglare layer that includes a binder layer and plural light diffusion particles which are dispersedly arranged in the binder layer are formed on the other surface of the substrate; a step of selectively exposing the photosensitive resin layer, by using the light shielding layer as a mask, by irradiating the intermediate body of the light diffusion member with exposure light from a side of the surface on which the antiglare layer is formed; and a step of forming a light diffusion portion that includes a light emission end surface which contacts with the substrate, a light incident end surface which faces the light emission end surface and has a larger area than an area of the light emission end surface, and a side surface which is formed between the light emission end surface and the light incident end surface, by removing a portion of the photosensitive resin layer that is not yet exposed to light.

(9) The method for manufacturing the light diffusion member, the method described in above (8), may be a method in which while a long substrate sheet on which the antiglare layer is in advance formed on the other side of the substrate is carried, treatments of the steps are performed for the substrate sheet.

(10) A display device in one aspect of the present invention includes: a display unit; and a light diffusion member that is provided on a viewing side of the display unit and emits light in a state where an angle distribution of light that is incident from the display unit is made wider than before incidence, in which the light diffusion member is the light diffusion member described in any one of above (1) to (7).

Advantageous Effects of Invention

As described above, aspects of the present invention may provide a light diffusion member and a method for manufacturing the same that may maintain in-plane uniformity of a light diffusion function in a light diffusion member with an antiglare layer and a display device that includes the light diffusion member with such an antiglare layer.

BRIEF DESCRIPTION OF DRAWINGS

FIG. 11 is a schematic configuration diagram of a liquid crystal display device that is described as a fourth embodiment of the present invention.

DESCRIPTION OF EMBODIMENTS

Embodiments of the present invention will hereinafter be described in detail with reference to drawings.

In all the following drawings, elements may be illustrated with different scales of dimensions for easy understanding of the elements.

{First Embodiment}

(Liquid Crystal Display Device)

Figure 1:
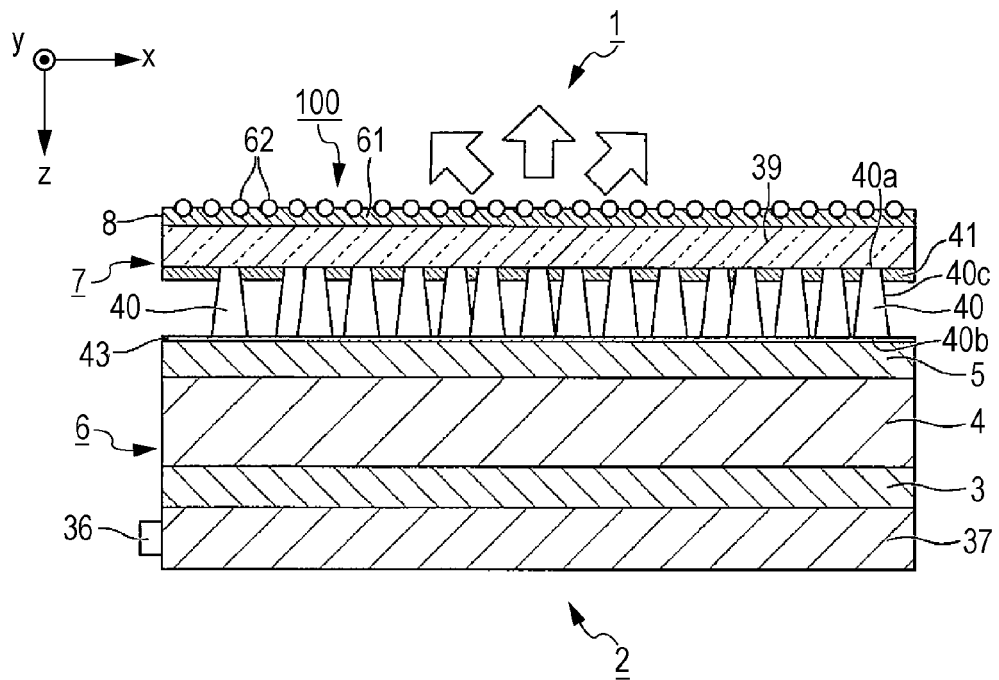
FIG. 1 is a cross-sectional view of a liquid crystal display device that is described as a first embodiment of the present invention.

First, a description will be made about a liquid crystal display device 1 illustrated in FIG. 1 as a first embodiment of the present invention. FIG. 1 is a cross-sectional view that illustrates a schematic configuration of the liquid crystal display device 1.

As illustrated in FIG. 1, the liquid crystal display device 1 mainly includes a backlight 2, a first polarizer 3, a liquid crystal panel 4, a second polarizer 5, a light diffusion member 7, and an antiglare layer 8. Among those, the backlight 2, the first polarizer 3, the liquid crystal panel 4, and the second polarizer 5 configure a liquid crystal display unit 6. Meanwhile, the light diffusion member 7 and the antiglare layer 8 configure a light diffusion member 100 with an antiglare layer.

In a description made below, the side on which the light diffusion member 7 is arranged will be referred to as viewing side, and the side on which the backlight 2 is arranged will be referred to as back side. Further, an x axis illustrated in the drawings indicates the horizontal direction of a screen of the liquid crystal panel 4, a y axis indicates the vertical direction of the screen of the liquid crystal panel 4, and a z axis indicates the thickness direction of the liquid crystal panel 4.

The backlight 2 has a light source 36 that is formed of a light emitting diode, a cold-cathode tube, or the like, for example, and a light guide 37 that causes the light emitted from the light source 36 to be emitted toward the liquid crystal panel 4 by using internal reflection. The light source 36 is arranged on an end surface of the light guide 37 (which is referred to as edge light type). Further, a configuration is possible in which the light source 36 is arranged directly under the light guide 37 (which is referred to as direct under type). The light guide 37 has a function of guiding the light emitted from the light source 36 to the liquid crystal panel 4. As a material of the light guide 37, a resin material such as acrylic resin is used, for example.

The light that is incident on the end surface of the light guide 37 from the light source 36 is totally reflected, propagates in an internal portion of the light guide 37, and is emitted from an upper surface (light emission surface) of the light guide 37 at a generally uniform intensity. Although not illustrated, a scattering sheet and a prism sheet are arranged on the upper surface of the light guide 37. The light emitted from the upper surface of the light guide 37 is scattered by the scattering sheet, thereafter concentrated by the prism sheet, and emitted in a generally paralleled state. As the prism sheet, BEF (product name) manufactured by Sumitomo 3M Limited is used, for example.

In this embodiment, a backlight that controls the emission direction of the light and thereby configures the directivity to be somewhat mild (low-directivity backlight) is preferably used as the backlight 2. As for the backlight 2, use of a backlight with directivity (directional backlight) is not necessarily to be avoided.

The first polarizer 3 functions as a polarizer and is arranged between the backlight 2 and the liquid crystal panel 4. Meanwhile, the second polarizer 5 functions as an analyzer and is arranged between the liquid crystal panel 4 and the light diffusion member 7.

The liquid crystal panel 4 is a transmissive type liquid crystal panel, for example. Further, the liquid crystal panel 4 is not limited to the transmissive type, but a liquid crystal panel of a translucent type (transmissive-reflective combined type) or a reflective type may be used. The liquid crystal panel 4 is an active matrix type liquid crystal panel and includes a thin film transistor (TFT) as a switching element that switches operations of pixels. Further, the liquid crystal panel 4 is not limited to the active matrix type but may be of a simple matrix type that does not include the switching element.

The light diffusion member 7 diffuses the light emitted from the viewing side of the liquid crystal panel 4, thereby widening a viewing angle (viewing angle widening film), and is provided on the viewing side (the second polarizer 5) of the liquid crystal panel 4.

The antiglare layer 8 is to improve the antiglare performance on the viewing side of the liquid crystal panel 4 and is provided on the viewing side of the light diffusion member 7.

The liquid crystal display device 1 that has the above-described configuration modulates the light emitted from the backlight 2 by the liquid crystal panel 4 and displays prescribed images, characters, and so forth by the modulated light. Further, when the light emitted from the liquid crystal panel 4 is transmitted and emitted through the light diffusion member 7, the angle distribution of the emitted light becomes wider than before the incidence on the light diffusion member 7. This enables an observer to visually recognize display with a wider viewing angle. Further, the viewability of display in a bright place may be enhanced by reducing the reflection of external light that is incident from the viewing side to the liquid crystal panel 4 on a surface of the antiglare layer 8.

(Liquid Crystal Panel)

Figure 2:
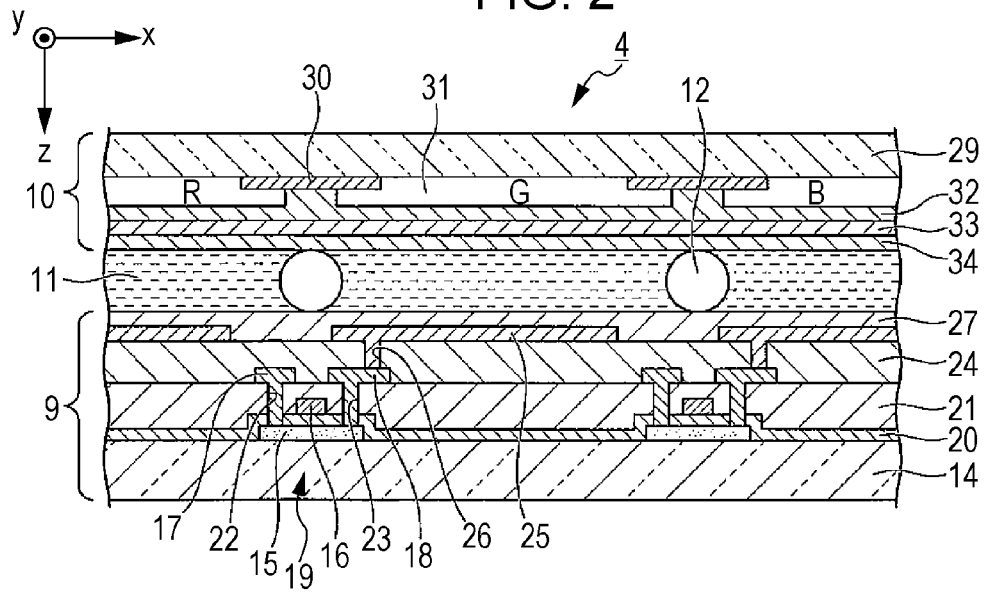
FIG. 2 is a cross-sectional view that illustrates a schematic configuration of a liquid crystal panel that is included in the liquid crystal display device according to the first embodiment.

Next, a specific configuration of the liquid crystal panel 4 will be described with reference to FIG. 2. FIG. 2 is a cross-sectional view that illustrates a schematic configuration of the liquid crystal panel 4.

As illustrated in FIG. 2, the liquid crystal panel 4 has a TFT substrate (also referred to as element substrate) 9, a color filter substrate (also referred to as counter substrate) 10 that is arranged to face the TFT substrate 9, and a liquid crystal layer 11 that is arranged between the TFT substrate 9 and the color filter substrate 10.

The liquid crystal layer 11 is held between the TFT substrate 9 and the color filter substrate 10 by sealing a periphery of a portion between the TFT substrate 9 and the color filter substrate 10 by a sealing member (not illustrated) and by injecting liquid crystal into the portion between those substrates. Further, spherical spacers 12 are arranged between the TFT substrate 9 and the color filter substrate 10 to maintain a regular interval between those substrates.

The liquid crystal panel 4 of this embodiment performs display in a vertical alignment (VA) mode, for example, and vertical alignment liquid crystal with negative dielectric anisotropy is used for the liquid crystal layer 11. The display mode is not limited to the VA mode, but a twisted nematic (TN) mode, a super twisted nematic (STN) mode, an in-plane switching (IPS) mode, and so forth may be used, for example.

Plural pixels (not illustrated) as minimum unit regions of display are arranged in the TFT substrate 9 in a matrix manner. In the TFT substrate 9, plural source bus lines (not illustrated) are formed to extend in parallel with each other, and plural gate bus lines (not illustrated) are formed to extend in parallel with each other and orthogonally to the plural source bus lines. Accordingly, on the TFT substrate 9, the plural source bus lines and the plural gate bus lines are formed in a lattice manner. A rectangular region defined by the adjacent source bus lines and the adjacent gate bus lines becomes a single pixel. The source bus lines are connected with a source electrode of a TFT, which will be described later. The gate bus lines are connected with a gate electrode of the TFT.

A TFT 19 that has a semiconductor layer 15, a gate electrode 16, a source electrode 17, a drain electrode 18, and so forth is formed on a surface on the liquid crystal layer 11 side of a transparent substrate 14 that configures the TFT substrate 9. A glass substrate may be used for the transparent substrate 14, for example. The semiconductor layer 15 that is formed of semiconductor materials such as continuous grain silicon (CGS), low-temperature poly-silicon (LPS), and amorphous silicon ($\alpha$-Si), for example, is formed on the transparent substrate 14. Further, the gate insulating film 20 is formed to cover the semiconductor layer 15 on the transparent substrate 14. Examples of materials used for the gate insulating film 20 may include a silicon oxide film, a silicon nitride film, or a laminated film of those, and so forth. The gate electrode 16 is formed to face the semiconductor layer 15 on the gate insulating film 20. Examples of materials used for the gate electrode 16 may include a laminated film of tungsten (W)/tantalum nitride (TaN), molybdenum (Mo), titanium (Ti), aluminum (Al), and so forth.

A first interlayer insulating film 21 is formed to cover the gate electrode 16 on the gate insulating film 20. Examples of materials used for the first interlayer insulating film 21 may include a silicon oxide film, a silicon nitride film, or a laminated film of those, and so forth. The source electrode 17 and the drain electrode 18 are formed on the first interlayer insulating film 21. The source electrode 17 is connected with a source region of the semiconductor layer 15 via a contact hole 22 that passes through the first interlayer insulating film 21 and the gate insulating film 20. Similarly, the drain electrode 18 is connected with a drain region of the semiconductor layer 15 via a contact hole 23 that passes through the first interlayer insulating film 21 and the gate insulating film 20. Conductive materials similar to the above-described gate electrode 16 are used as materials of the source electrode 17 and the drain electrode 18. A second interlayer insulating film 24 is formed to cover the source electrode 17 and the drain electrode 18 on the first interlayer insulating film 21. Materials similar to the above-described first interlayer insulating film 21 or organic insulating materials are used as materials of the second interlayer insulating film 24.

A pixel electrode 25 is formed on the second interlayer insulating film 24. The pixel electrode 25 is connected with the drain electrode 18 via a contact hole 26 that passes through the second interlayer insulating film 24. That is, the pixel electrode 25 is connected with the drain region of the semiconductor layer 15 via the drain electrode 18 as a relay electrode. Examples of materials used for the pixel electrode 25 may include transparent conductive materials such as indium tin oxide (ITO) and indium zinc oxide (IZO). This configuration allows scanning signals to be supplied through the gate bus line and image signals supplied to the source electrode 17 through the source bus line to be supplied to the pixel electrode 25 via the semiconductor layer 15 and the drain electrode 18 when the TFT 19 becomes an ON state. Further, an alignment film 27 is formed on whole the second interlayer insulating film 24 to cover the pixel electrode 25. This alignment film 27 has alignment anchoring force that causes liquid crystal molecules which configure the liquid crystal layer 11 to be vertically aligned. A mode of the TFT may be a top gate type TFT, which is illustrated in FIG. 2, or a bottom gate type TFT.

Meanwhile, a black matrix 30, a color filter 31, a planarization layer 32, a counter electrode 33, and an alignment film 34 are sequentially formed on the surface on the liquid crystal layer 11 side of a transparent substrate 29 that configures the color filter substrate 10. The black matrix 30 has a function of blocking transmission of light in regions among the pixels and is formed of metal such as a multilayer film of chromium (Cr) or Cr/Cr oxide or a photoresist in which carbon particles are dispersed in a photosensitive resin. The color filter 31 contains pigments of colors of red (R), green (G), and blue (B). Any one of the color filters 31 of R, G, and B is arranged to face the single pixel electrode 25 on the TFT substrate 9. The color filters 31 may be configured with multiple colors of three colors of R, G, and B or more. The planarization layer 32 is configured with an insulating film that covers the black matrices 30 and the color filters 31 and has a function of reducing unevenness caused by the black matrices 30 and the color filters 31 for planarization. The counter electrode 33 is formed on the planarization layer 32. Transparent conductive materials similar to the pixel electrode 25 are used as materials of the counter electrode 33. Further, the alignment film 34 that has vertical alignment anchoring force is formed on the whole surface of the counter electrode 33.

In a manufacturing procedure of the liquid crystal display unit 6, the TFT substrate 9 and the color filter substrate 10 are first fabricated individually. The TFT substrate 9 and the color filter substrate 10 are thereafter attached together via the sealing member while those substrates are arranged such that the surface of the TFT substrate 19 on the side on which the TFT 19 is formed faces the surface of the color filter substrate 10 on the side on which the color filter 31 is formed. The liquid crystal is thereafter injected into the space surrounded by the TFT substrate 9, the color filter substrate 10, and the sealing member. Then, the first polarizer 3 and the second polarizer 5 are attached to respective sides of the liquid crystal panel 4 which is made as described above by using an optical adhesive or the like. The liquid crystal display unit 6 is fabricated through the above-described procedure.

Known methods are used in methods for manufacturing the TFT substrate 9 and the color filter substrate 10 in related art, and descriptions thereof will thus not be made.

(Light Diffusion Member with Antiglare Layer)

Figure 3:
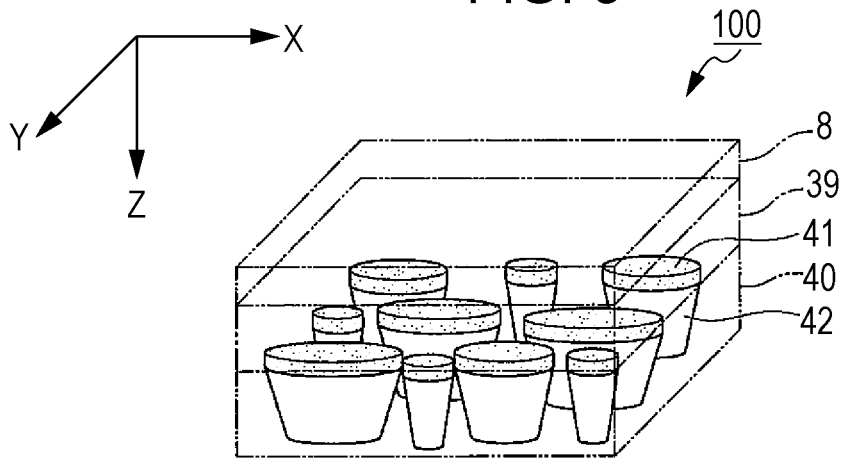
FIG. 3 is a perspective view that illustrates a schematic configuration of a light diffusion member with an antiglare layer that is included in the liquid crystal display device according to the first embodiment.
Figure 4:
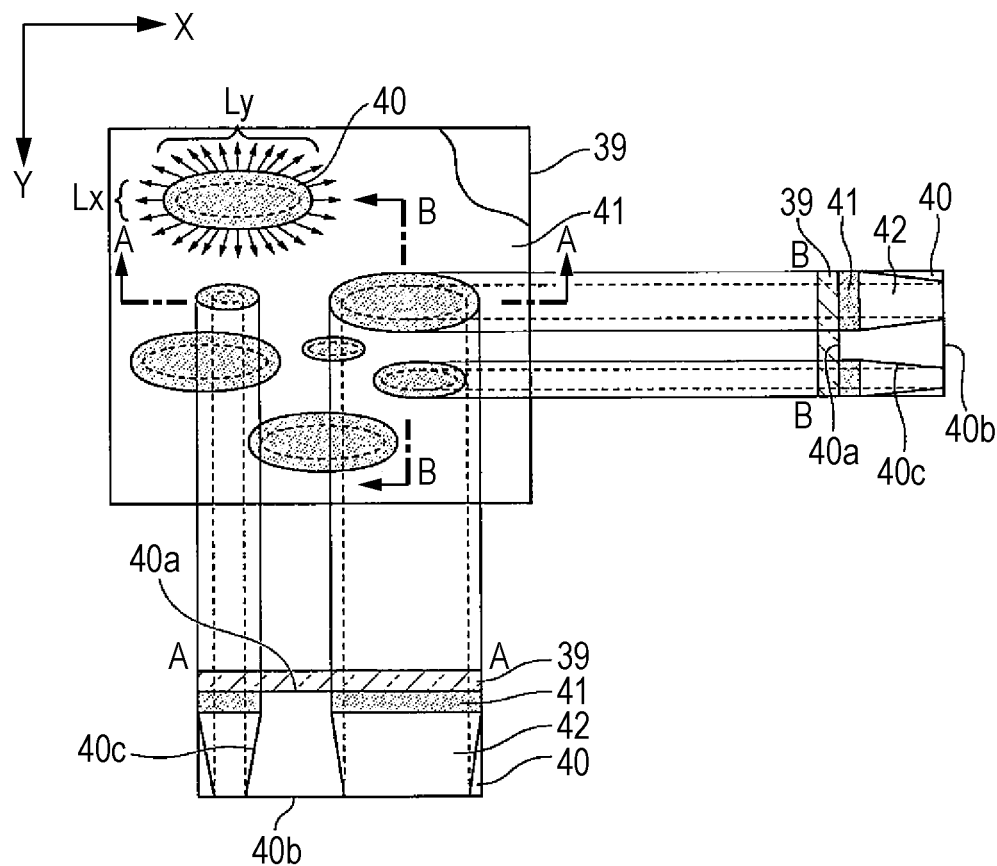
FIG. 4 is a schematic configuration diagram of the light diffusion member that is included in the light diffusion member with the antiglare layer according to the first embodiment.

Next, a specific configuration of the light diffusion member 100 with the antiglare layer will be described with reference to FIGS. 3 and 4. FIG. 3 is a perspective view of the light diffusion member 100 with the antiglare layer as seen from the viewing side. FIG. 4 is a schematic diagram that illustrates a configuration of the light diffusion member 7. The upper left side of FIG. 4 is a plan view of the light diffusion member 7. The lower left side of FIG. 4 is a cross-sectional view taken along line A-A of the plan view on the upper left side. The upper right side of FIG. 4 is a cross-sectional view taken along line B-B of the plan view on the upper left side.

As illustrated in FIGS. 3 and 4, the light diffusion member 100 with the antiglare layer is formed of the light diffusion member 7 that is integrally formed with the antiglare layer 8.

The light diffusion member 7 includes a substrate 39 that has optical transparency, light diffusion portions 40 formed on one surface (the surface on the opposite side to the viewing side) of the substrate 39, and light shielding layers (light absorption portions) 41 and has a structure in which the light shielding layers 41 are separately arranged in plural regions in a region in which the light diffusion portions 40 are formed.

For example, transparent resin films such as a triacetylcellulose (TAC) film, and polyethylene terephthalate (PET), polycarbonate (PC), polyethylene naphthalate (PEN), and polyethersulfone (PES) films are preferably used for the substrate 39. In a manufacturing process, which will be described layer, the substrate 39 later serves as a foundation on which the light shielding layers 41 and the light diffusion portions 40 are formed and thus has to have heat resistance and mechanical strength to a heat treatment procedure in the manufacturing process. Accordingly, a substrate formed of glass or the like may be used for the substrate 39 other than the substrate formed of a resin. However, the thickness of the substrate 39 is preferably thin to the extent that the heat resistance or the mechanical strength is not impaired. The reason is because the thicker substrate 39 may cause the more blurry display. In this embodiment, a transparent resin film with a thickness of 100 µm is used as one example of the substrate 39. Further, the total light transmittance of the substrate 39 is preferably 90% or higher in accordance with the specification of JIS K7361-1. The total light transmittance of 90% or higher may provide sufficient transparency.

The light diffusion portion 40 is configured with an organic material that has optical transparency and photosensitivity such as an acrylic resin or an epoxy resin, for example. Further, the total light transmittance of the light diffusion portion 40 is preferably 90% or higher in accordance with the specification of JIS K7361-1. The total light transmittance of 90% or higher may provide sufficient transparency.

The light diffusion portion 40 has a light emission end surface 40a, a light incident end surface 40b, and a side surface 40c. The light emission end surface 40a is a surface that contacts with the substrate 39. The light incident end surface 40b is a surface that faces the light emission end surface 40a. The side surface 40c is a surface that is formed between the light emission end surface 40a and the light incident end surface 40b. The area of the light incident end surface 40b is larger than the area of the light emission end surface 40a. That is, the area of the horizontal cross-section of the light diffusion portion 40 gradually expands from the substrate 39 side toward the opposite side to the substrate 39. Accordingly, the side surface 40c of the light diffusion portion 40 is an inclined surface that is inclined in an inversely tapered manner from the substrate 39 side toward the opposite side to the substrate 39.

The light diffusion portion 40 is a portion that contributes to transmission of light in the light diffusion member 7. That is, the light that is incident from the light incident end surface 40b of the light diffusion portion 40 is totally reflected by the side surface 40c of the light diffusion portion 40, guided while being substantially sealed in an internal portion of the light diffusion portion 40, and then emitted from the light emission end surface 40a.

The angle formed by a side surface 40 with respect to the light incident end surface 40b (hereinafter referred to as taper angle) is preferably 75° or larger to 85° or smaller. In this embodiment, the taper angle of the side surface 40c is 85°. However, the taper angle of the side surface 40c is not particularly limited as long as the taper angle is an angle that may sufficiently diffuse the incident light when the light is emitted from the light diffusion member 7. In this embodiment, the side surface 40c has a regular taper angle.

The height of the light diffusion portion 40 from the light incident end surface 40b to the light emission end surface 40a is configured to be larger than the layer thickness of the light shielding layer 41. In a case of this embodiment, the layer thickness of the light shielding layer 41 is approximately 150 nm as one example. The height of the light diffusion portion 40 from the light incident end surface 40b to the light emission end surface 40a is approximately 20 μm as one example.

The light shielding layers 41 are arranged at random when seen in the normal direction of a main surface of the substrate 39. The light shielding layer 41 is configured with an organic material that is light-absorbing and photosensitive such as a black resin that contains carbon, a black resist, or black ink, as one example. Other than that, a metal film such as a multilayer film of chromium (Cr) or Cr/Cr oxide may be used.

The light diffusion member 7 has plural air-cavities 42. The air-cavity 42 is a portion that is surrounded by the side surface 40c of the light diffusion portion 40 and the light shielding layer 41, and air is present in the air-cavity 42. Meanwhile, the light diffusion portions 40 are collectively provided in a portion other than the plural air-cavities 42.

It is preferable that the refractive index of the substrate 39 and the refractive index of the light diffusion portion 40 are substantially equivalent. The reason is as follows: For example, a case is assumed where the refractive index of the substrate 39 and the refractive index of the light diffusion portion 40 are largely different. In this case, unnecessary refraction or reflection of light occurs at the interface between the light diffusion portion 40 and the substrate 39 when the light that is incident from the light incident end surface 40b is emitted from the light emission end surface 40a. In this case, the reason is because problems such as difficulty in obtainment of a desired viewing angle and reduction in the amount of emitted light may occur.

In a case of this embodiment, air is interposed in the air-cavities 42 (external portions of the light diffusion portion 40). Thus, the side surface 40c of the light diffusion portion 40 serves as an interface between a transparent acrylic resin and air in a case where the light diffusion portion 40 is formed of the transparent acrylic resin, for example. Here, the air-cavity 42 may be filled with another material with a low refractive index. However, the difference in the refractive index at the interface between the internal portion and the external portion of the light diffusion portion 40 becomes largest in a case where air is present compared to a case where any material with a low refractive index is present in the external portion. Thus, in accordance with Snell's law, the critical angle becomes smallest in the configuration of this embodiment, and the incident angle range where light is totally reflected by the side surface 40c of the light diffusion portion 40 becomes widest. As a result, loss of light may be further reduced, and high luminance may be obtained.

The plural light shielding layers 41 are arranged on one surface of the substrate 39 in a scattered manner. The planar shape of the light shielding layer 41 as seen in the normal direction of the substrate 39 is an elongated elliptic shape. Further, a portion that corresponds to the portion below the light shielding layer 41 is the air-cavity 42 in a truncated elliptic cone shape.

The light shielding layer 41 has a major axis and a minor axis. Here, the major axis is an axis with the longest length in the planar shape of the light shielding layer 41 as seen in the normal direction of the substrate 39. The minor axis is an axis with the shortest length in the planar shape of the light shielding layer 41 as seen in the normal direction of the substrate 39. In the light diffusion member 7 of this embodiment, the ratio of the length of the minor axis to the length of the major axis is approximately equivalent in each of the light shielding layers 41.

In the light diffusion member 7 of this embodiment, the major axis direction of the ellipse that forms the planar shape of each of the light shielding layers 41 (which may hereinafter be referred to as the major axis direction of the light shielding layer) is generally along the X-direction. The minor axis direction of the ellipse that forms the planar shape of each of the light shielding layers 41 (which may hereinafter be referred to as the minor axis direction of the light shielding layer) is generally along the Y-direction. Accordingly, considering the orientation of the side surface 40c of the light diffusion portion 40, the ratio of the side surface 40c along the X-direction is higher than the ratio of the side surface 40c along the Y-direction in the side surface 40c of the light diffusion portion 40. Thus, light Ly that is reflected by the side surface 40c along the X-direction and diffuses in the Y-direction is more than light Lx that is reflected by the side surface 40c along the Y-direction and diffuses in the X-direction. Accordingly, the azimuth angle direction where the diffusibility of a light diffusion member 9 is highest is the Y-direction that is the minor axis direction of the light shielding layer 41.

The planar shape of the light shielding layer 41 may include shapes such as circle, polygons, and semicircle. Further, the light shielding layers 41 may be formed to partially overlap with each other.

As illustrated in FIG. 1, the antiglare layer 8 mainly includes a binder layer 61 and plural light diffusion particles 62 that are dispersedly arranged in the binder layer 61.

The binder layer 61 is formed by coating an antiglare layer material onto the other surface of the substrate 39. As the antiglare layer material, transparent resin materials such as polymethyl methacrylate resin (PMMA) and polyethylene terephthalate (PET) may be used, for example.

The light diffusion particle 62 is formed of an inorganic oxide particle such as silicon oxide ($SiO_2$) or titanium oxide ($TiO_2$) or a transparent resin particle such as polymethyl methacrylate resin (PMMA). The average particle diameter of the light diffusion particles 62 is approximately 5 to 30 μm.

The plural light diffusion particles 62 are dispersedly arranged in a state where those are partially exposed from a surface of the binder layer 61. Accordingly, in a case where the light diffusion member 100 with the antiglare layer is manufactured by the roll-to-roll (R to R) lamination method, the contact area is reduced by the plural light diffusion particles 62 that are exposed from the surface of the antiglare layer 8, and adhesion of the light diffusion member 100 with the antiglare layer that is wound in a roll may thereby be avoided.

As illustrated in FIG. 1, the light diffusion member 100 with the antiglare layer that has the above-described configuration is arranged on the viewing side of the liquid crystal display unit 6. That is, the light diffusion portions 40 are attached to the second polarizer 5 via an adhesion layer 43 in a state where the antiglare layer 8 on the outermost surface is directed toward the viewing side.

Incidentally, as illustrated in FIGS. 5(A) to (D), in the light diffusion member 100 with the antiglare layer of this embodiment, given that the average value of the distances between the centers of arbitrary neighboring light diffusion particles 62 among the light diffusion particles 62 is $D_{AVE}$, the average value of the distances between the centers of arbitrary neighboring light diffusion portions 40 among the light diffusion portions 40 is $d_{AVE}$, the angle (taper angle) that the side surface 40c forms with respect to the light incident end surface 40b is θ, and the thickness of the substrate 39 is T, the antiglare layer 9 of this embodiment satisfies the relationship of the following expression (1).

$$D_{AVE} - 2T/\tan θ \leq d_{AVE} \quad (1)$$

Figure 5:
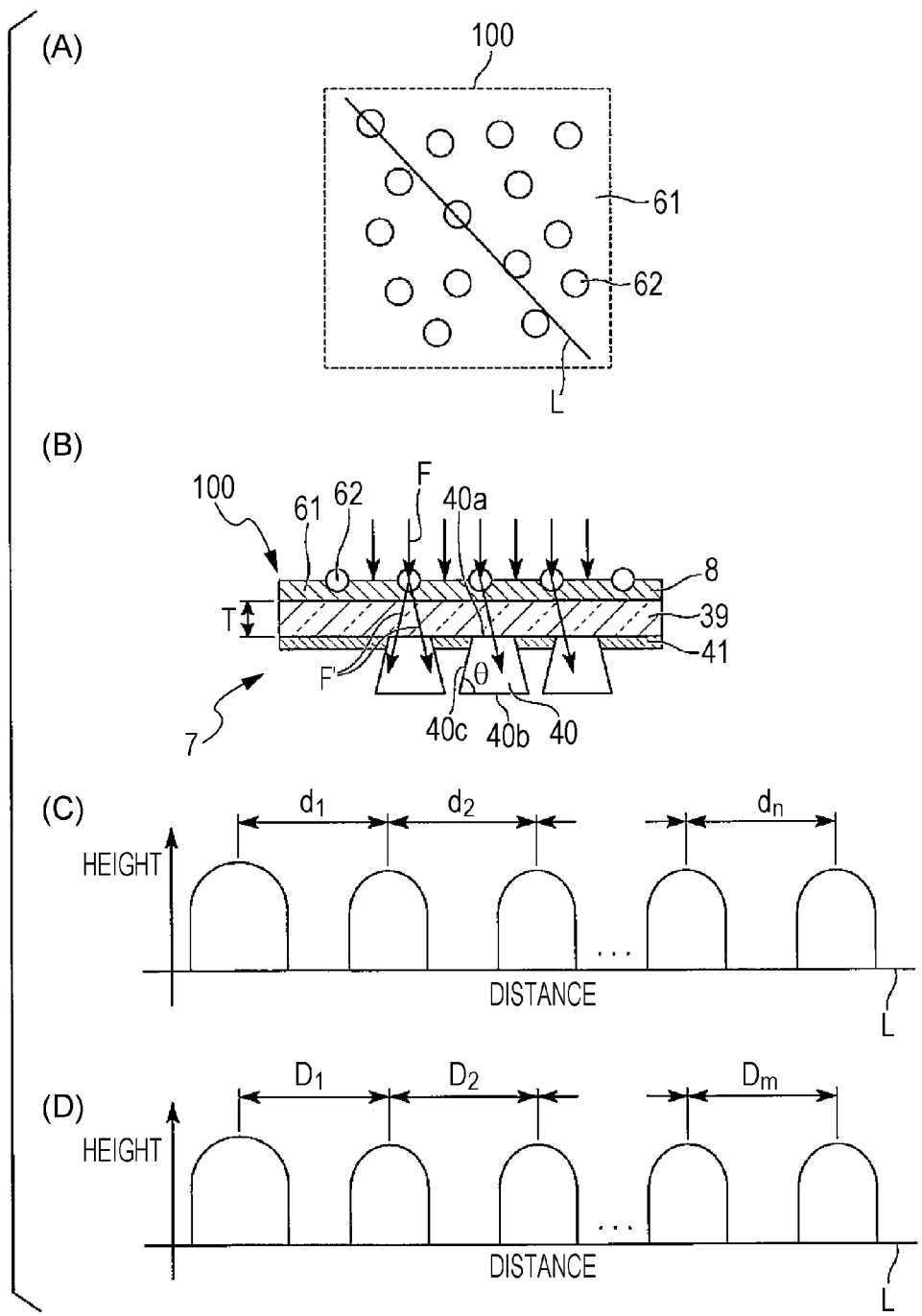
FIG. 5 is a diagram for explaining design conditions of the light diffusion member according to the first embodiment.

FIG. 5(A) is a plan view of the light diffusion member 100 with the antiglare layer as seen from the antiglare layer 8 side. FIG. 5(B) is a vertical cross-sectional view of the light diffusion member 100 with the antiglare layer. FIG. 5(C) is a distribution diagram that illustrates the distances and heights of the light diffusion particles 62 on a straight line L. FIG. 5(D) is a distribution diagram that illustrates the distances and heights of the light diffusion portions 40 on the straight line L.

As for $d_{AVE}$, an arbitrary straight line L is drawn on the plane of the light diffusion member 100 with the antiglare layer, and the cross-sectional profiles of the light diffusion particles 62 that are positioned on the straight line L are measured. Then, the average value of the distances d1, d2, . . . , dn (n represents an integer) between the peaks of the heights of the light diffusion particles 62 on the straight line L is obtained from the measured cross-sectional profiles, and the obtained value is set as $d_{AVE}$. Further, the number n of the light diffusion particles 62 that are measured on the straight line L is 100 or more (n≥100).

Further, a similar method to $d_{AVE}$ may be used for $D_{AVE}$. That is, an arbitrary straight line L is drawn on the plane of the light diffusion member 100 with the antiglare layer, and the cross-sectional profiles of the light diffusion portions 40 that are positioned on the straight line L are measured. Then, the average value of the distances D1, D2, . . . , Dm (m represents an integer) between the peaks of the heights of the light diffusion portions 40 on the straight line L is obtained from the measured cross-sectional profiles, and the obtained value is set as $d_{AVE}$. Further, the number m of the light diffusion portions 40 that are measured on the straight line L is 100 or more (m≥100).

The above expression (1) represents the relationship among an average pitch $d_{AVE}$ of the light diffusion particles 62, an average pitch $D_{AVE}$ of the light diffusion portion 40 in the antiglare layer 8, the thickness T of the substrate 39, and the taper angle θ of the side surface 40c of the light diffusion portion 40. In order to control the taper angle θ of the side surface 40c of the light diffusion portion 40 to a desired angle, the density of the light diffusion particles 62 has to be increased to a certain degree. The above expression (1) represents the relationship that satisfies such conditions.

In a case where the above expression (1) is satisfied, the light diffusion member 100 with the antiglare layer may maintain in-plane uniformity of the light diffusion function while maintaining an anti-adhesion characteristic which is described above. That is, in the light diffusion member 100 with the antiglare layer, a dry film resist (photosensitive resin layer) is exposed to light with the light shielding layer 41, which will be described later, serving as a mask, and the dry film resist may be irradiated with exposure light that is diffused by the light diffusion particles 62 of the antiglare layer 8 in a procedure of forming the light diffusion portions 40. In addition, in the case where the above expression (1) is satisfied, the diffusion angle of the exposure light may be made uniform in the plane of the antiglare layer 8. As a result, non-uniformity of the taper angle θ of the side surface 40c that is provided to the light diffusion portion 40 may be suppressed to a low level. Accordingly, the light diffusion member 100 with the antiglare layer may reduce occurrence of non-uniformity of the viewing angle characteristics in attachment to the liquid crystal panel 4.

For example, in a case where the light diffusion member with the antiglare layer, in which one planar shape of the light shielding layer is set as an elliptic shape, the length in the major axis direction of the light shielding layer is set as 20 μm, the length in the minor axis direction is set as 10 μm, the coverage factor of the light shielding layer in the plane is set as 30%, the taper angle θ of the side surface of the light diffusion portion is set as 85°, and the thickness T of the substrate is set as 80 μm, is attached to a 19-inch WXGA (82 ppi) TN liquid crystal display, and the light shielding layers are arranged in random arrangement close to hexagonal closest packing, the average pitch $d_{AVE}$ of the light shielding layer becomes approximately 17 μm.

It is preferable to use the antiglare layer in which the average particle diameter of the light diffusion particles is 10 μm and the average pitch of the antiglare layer is 17 μm, which is equivalent to the light shielding layer, for example, for this light diffusion member with the antiglare layer. Further, even in a case where the average pitch of the antiglare layer is 30 μm, which is larger than the average pitch of the light shielding layer, for example, there is not a problem because 30−14<17 ($=d_{AVE}$).

In the liquid crystal display device 1, such a light diffusion member 100 with the antiglare layer is arranged on the viewing side of the liquid crystal display unit 6, and the viewing angle may thereby be widened while the light emitted from the viewing side of the liquid crystal display unit 6 is diffused. Further, because illumination light from the backlight 2 is diffused by the light diffusion portions 40 and thereafter further scattered by the light diffusion particles 62 of the antiglare layer 8, an effect of further improving the viewing angle characteristics is provided. Further, the viewability of display in a bright place may be enhanced by reducing the reflection of external light that is incident from the viewing side to the liquid crystal display unit 6 on the surface of the antiglare layer 8.

(Method for Manufacturing Light Diffusion Member with Antiglare Layer)

Figure 6:
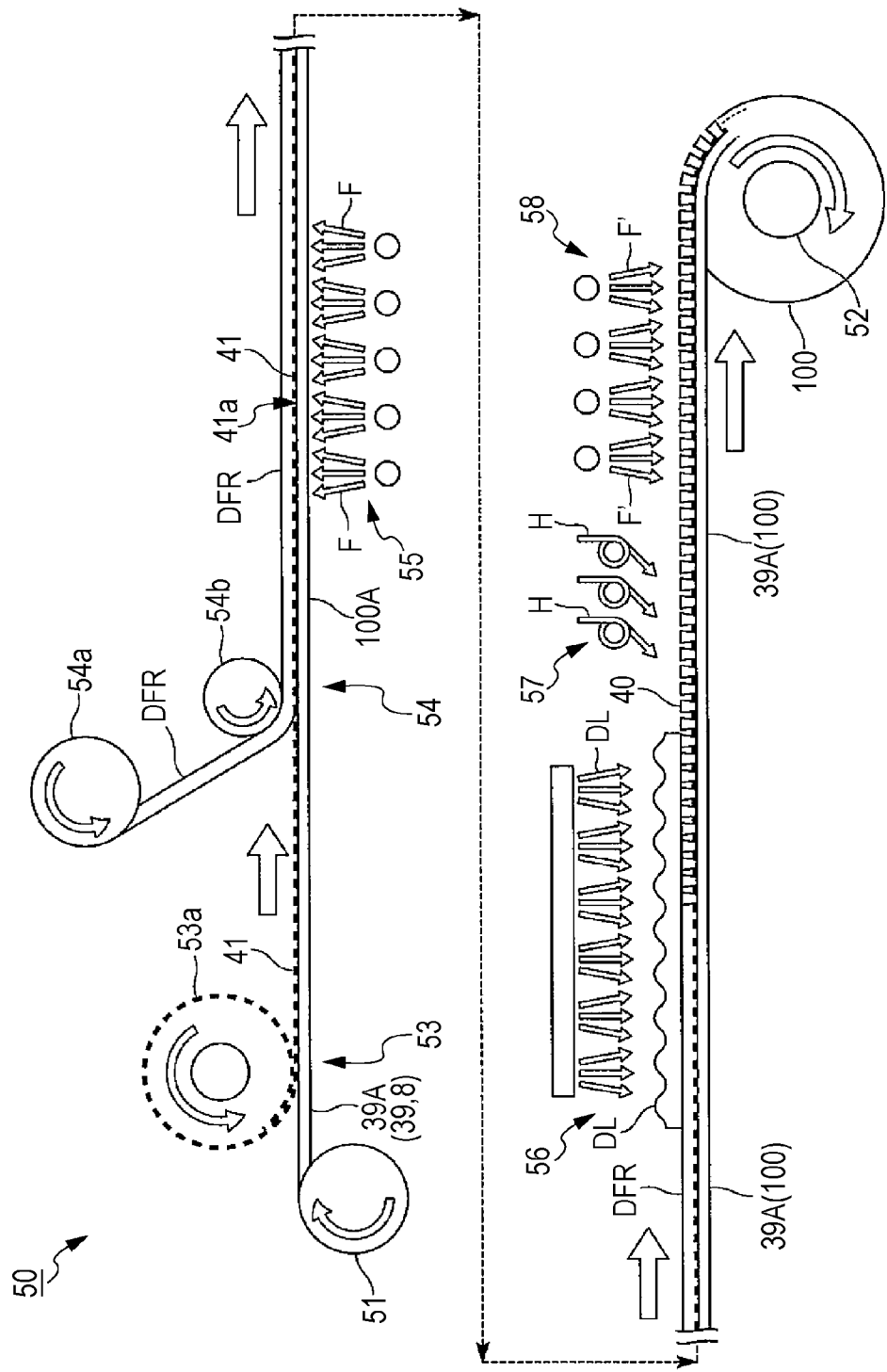
FIG. 6 is a side view that illustrates one example of a manufacturing device of the light diffusion member according to the first embodiment.
Figure 7:
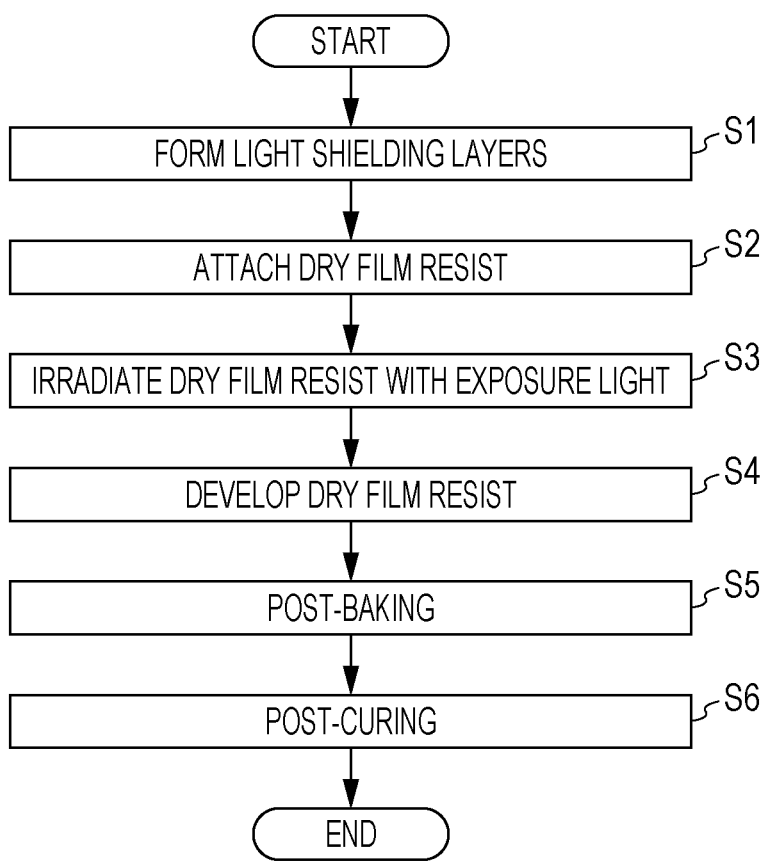
FIG. 7 is a flowchart that illustrates a manufacturing procedure of the light diffusion member with the antiglare layer according to the first embodiment.

Next, a method for manufacturing the light diffusion member 100 with the antiglare layer will be described with reference to FIGS. 6 and 7. FIG. 6 is a side view that illustrates a configuration of a manufacturing device 50 of the light diffusion member 100 with the antiglare layer. FIG. 7 is a flowchart that illustrates a manufacturing procedure of the light diffusion member 100 with the antiglare layer.

As illustrated in FIG. 6, the manufacturing device 50 carries a long substrate sheet 39A in which the antiglare layer 8 is in advance formed on the other side of the substrate 39 in a roll-to-roll (R to R) lamination manner and performs various treatments during the carriage. In this embodiment, the substrate 39 on which the antiglare layer 8 is in advance formed is used, and adhesion of the substrate sheet 39A that is wound in a roll may thereby be avoided. Further, the manufacturing device 50 uses a printing method for formation of the light shielding layer 41, instead of a photolithographic method that uses the photomask 45.

The manufacturing device 50 has a configuration in which a sending roller 51 that sends out the substrate sheet 39A is provided on one end side, a winding roller 52 that winds the substrate sheet 39A is provided on the other end side, and the substrate sheet 39A is thereby carried (moved) from the sending roller 51 side toward the winding roller 52 side.

In an intermediate portion in the carrying direction of the substrate sheet 39A, a printing device 53, an attaching device 54, a light exposing device 55, a developing device 56, a drying device 57, and a curing device 58 are sequentially arranged from the sending roller 51 side toward the winding roller 52 side.

The printing device 53 forms the plural light shielding layer 41 on the substrate sheet 39A by gravure printing. The attaching device 54 attaches a negative dry film resist (photosensitive resin layer) DFR onto the substrate sheet 39A on which the plural light shielding layers 41 are formed. The light exposing device 55 performs irradiation with exposure light F from the substrate sheet 39A side and performs light exposure of the dry film resist DFR. The developing device 56 develops the dry film resist DFR that has been exposed to light by a developer DL. The drying device 57 performs drying (post-baking) of the substrate sheet 39A on which the light diffusion portions 40 formed of the developed dry film resist DFR are formed. The curing device 53 irradiates the substrate sheet 39A on which the light diffusion portions 40 are formed with ultra-violet light (UV light) F' and performs curing (post-curing) of the light diffusion portions 40.

In a case where the light diffusion member 100 with the antiglare layer is manufactured by using the manufacturing device 50, in step S1 illustrated in FIG. 7, the plural light shielding layers 41 are first formed on one surface of the substrate sheet 39A by gravure printing. Specifically, as illustrated in FIG. 6, while a printing roller 53a included in the printing device 53 is rotated on the surface of the substrate sheet 39A in the same direction as the carrying direction of the substrate sheet 39A, a light shielding layer material that becomes the light shielding layers 41 is transferred. This enables the plural light shielding layers 41 to be collectively formed on one surface of the substrate sheet 39A.

For example, the planar shape of the light shielding layer 41 is an elliptic shape, and the film thickness of the light shielding layer 41 is 150 nm. Further, the regions other than the light shielding layers 41 form openings 41a that correspond to formation regions of the light diffusion portions 40 in the next procedure. The arrangement of the intervals (pitches) of the adjacent light shielding layers 41 is neither regular nor periodic. The intervals (pitches) of the light shielding layers 41 are preferably shorter than the intervals (pitches; 150 µm, for example) of the pixels of a liquid crystal panel 2. Accordingly, at least one light shielding layer 41 is formed in the pixel. Thus, a wide viewing angle may be expected when the light shielding layers 41 are combined with a liquid crystal panel with short pixel pitches that are used for a mobile apparatus or the like, for example.

In this embodiment, the light shielding layers 41 are formed by using gravure printing. However, embodiments are not limited to this, but gravure offset printing may also be used. Other than that, the light shielding layers 41 may be formed by a photolithographic method that uses a black negative resist. In this case, in a case of using a photomask in which an opening pattern and a light shielding pattern are inverted, a light-absorbing positive resist may also be used. Alternatively, the light shielding layers 41 may directly formed by using an evaporation method, an ink-jet method, or the like.

Next, in step S2 illustrated in FIG. 7, the dry film resist DFR is attached onto the substrate sheet 39A on which the plural light shielding layers 41 are formed. Specifically, as illustrated in FIG. 6, while the dry film resist DFR is sent out from a sending roller 54a included in the attaching device 54 and an attaching roller 54b is rotated in the same direction as the carrying direction of the substrate sheet 39A, the dry film resist DFR with a thickness of approximately 20 µm, for example, is attached on the surface of the substrate sheet 39A.

This enables obtainment of an intermediate body 100A in which the plural light shielding layers 41 and the dry film resist (photosensitive resin layer) DFR that covers the surface, on which the light shielding layers 41 are formed, are formed on one surface of the substrate sheet 39A (substrate 39) and the antiglare layer 8 is formed on the other surface of the substrate sheet 39A (substrate 39).

Next, in step S3 illustrated in FIG. 7, the light exposure is performed for the dry film resist DFR of the intermediate body 100A. Specifically, as illustrated in FIG. 6, the antiglare layer 8 side of the substrate sheet 39A is irradiated with the exposure light F that is emitted from plural light sources 55a included in the light exposing device 55. This enables the light exposure of the dry film resist DFR to be performed with the light shielding layers 41 serving as a mask. Here, ultra-violet light (UV light) is used as the exposure light F. In this embodiment, the light exposure by using mixed rays of i ray at a wavelength of 365 nm, h ray at a wavelength of 404 nm, and g ray at a wavelength of 436 nm is performed. Further, the light exposure amount is 500 mJ/cm$^2$.

In this embodiment, the exposure light F is diffused by the light diffusion particles 62 of the antiglare layer 8, and the exposure light F that is suitable for the light exposure of the dry film resist DFR may thereby be obtained. The dry film resist DFR is exposed to light such that such diffused exposure light F is radially spread from non-formation regions (openings 41a) of the light shielding layers 41 toward the outside. In this embodiment, the diffusion angle of the exposure light F may be made uniform in the plane of the antiglare layer 8, and non-uniformity of the taper angle θ of the side surface 40c that is provided to the light diffusion portion 40 may thus be suppressed to a low level.

As for the exposure light F, a change in the intensity of the exposure light F such as gradually softening the intensity of the exposure light F may be made in accordance with the travel of the substrate sheet 39A. Further, the emission angle of the exposure light F may gradually be changed in accordance with the travel of the substrate sheet 39A. Further, the exposure light F may be light that is parallel light diffused by a diffusion plate. Accordingly, the taper angle θ of the side surface 40c of the light diffusion portion 40 may be controlled to a desired angle.

Next, in step S4 illustrated in FIG. 7, development is performed for the dry film resist DFR that has been exposed to light. Specifically, as illustrated in FIG. 6, the developing device 56 coats the developer DL onto the dry film resist DFR that has been exposed to light. Accordingly, portions of the dry film resist DFR, which have not been exposed to light, are removed, and the light diffusion portions 40 are formed on one surface of the substrate sheet 39A.

Next, in step S5 illustrated in FIG. 7, drying (post-baking) of the substrate sheet 39A on which the light diffusion portions 40 are formed is performed. Specifically, as illustrated in FIG. 6, the drying device 57 blows hot wind H at 100° C. from the light diffusion portion 40 side of the substrate sheet 39A and thereby performs drying (post-baking) of the light diffusion portions 40. As for the post-baking, drying by a hot plate or drying by irradiation with infrared rays may be performed.

Next, in step S6 illustrated in FIG. 7, curing (post-curing) of the light diffusion portions 40 is performed. Specifically, as illustrated in FIG. 6, irradiation with the ultra-violet light (UV light) F' that is emitted from plural light sources 58a included in the curing device 58 is performed from the light diffusion portion 40 side of the substrate sheet 39A, and the light diffusion portions 40 are thereby cured.

The light diffusion member 100 with the antiglare layer may be obtained through the above-described procedure.

In this embodiment, in the procedure of forming the light diffusion portions 40, the dry film resist DFR may be irradiated with the exposure light F that is diffused by the light diffusion particles 62 of the antiglare layer 8. Further, the diffusion angle of the exposure light F may be made uniform in the plane of the antiglare layer 8. As a result, non-uniformity of the taper angle θ of the side surface 40c that is provided to the light diffusion portion 40 may be suppressed to a low level. Accordingly, the obtained light diffusion member 100 with the antiglare layer may reduce occurrence of non-uniformity of the viewing angle characteristics in attachment to the liquid crystal panel 4.

Further, in this embodiment, in the procedure of forming the light diffusion portions 40, irradiation with the exposure light F is performed with the light shielding layers 41 serving as masks, and the light diffusion portions 40 are thus formed in the positions of the openings 41a of the light shielding layers 41 in a self-aligned state. As a result, because the light diffusion portions 40 closely contact with the light shielding layers 41 and gaps therebetween are not formed, the optical transmittance may certainly be maintained. Further, delicate alignment work is not necessary, and the time necessary for the manufacturing may thus be reduced.

Further, in this embodiment, a case is exemplified where the intermediate body 100A is fabricated by using the substrate sheet 39A on which the antiglare layer 8 is in advance formed. However, in fabricating the intermediate body 100A, a procedure of forming the antiglare layer 8 on the other side of the substrate sheet 39A may be separately provided on the way of the carriage of the substrate sheet 39A in the roll-to-roll (R to R) lamination manner.

Further, a procedure of additionally attaching an optical sheet that becomes the second polarizer 5 to the light diffusion member 100 with the antiglare layer obtained through the above procedure may be provided. Accordingly, the light diffusion member 100 with the antiglare layer may be integrally formed with the second polarizer 5.

As illustrated in FIG. 1, the fabricated light diffusion member 100 with the antiglare layer is cut into a prescribed size in accordance with the liquid crystal panel 4 and thereafter attached to the liquid crystal display unit 6. That is, the light diffusion member 100 with the antiglare layer is attached to the second polarizer 5 in a state where the substrate 39 is directed toward the viewing side and the light diffusion portions 40 face the second polarizer 5.

The liquid crystal display device 1 may be fabricated through the above-described procedure.

{Second Embodiment}

(Light Diffusion Member with Antiglare Layer)

Next, a description will be made about a liquid crystal display device 201 illustrated in FIGS. 8(A) and (B) as a second embodiment.

Figure 8:
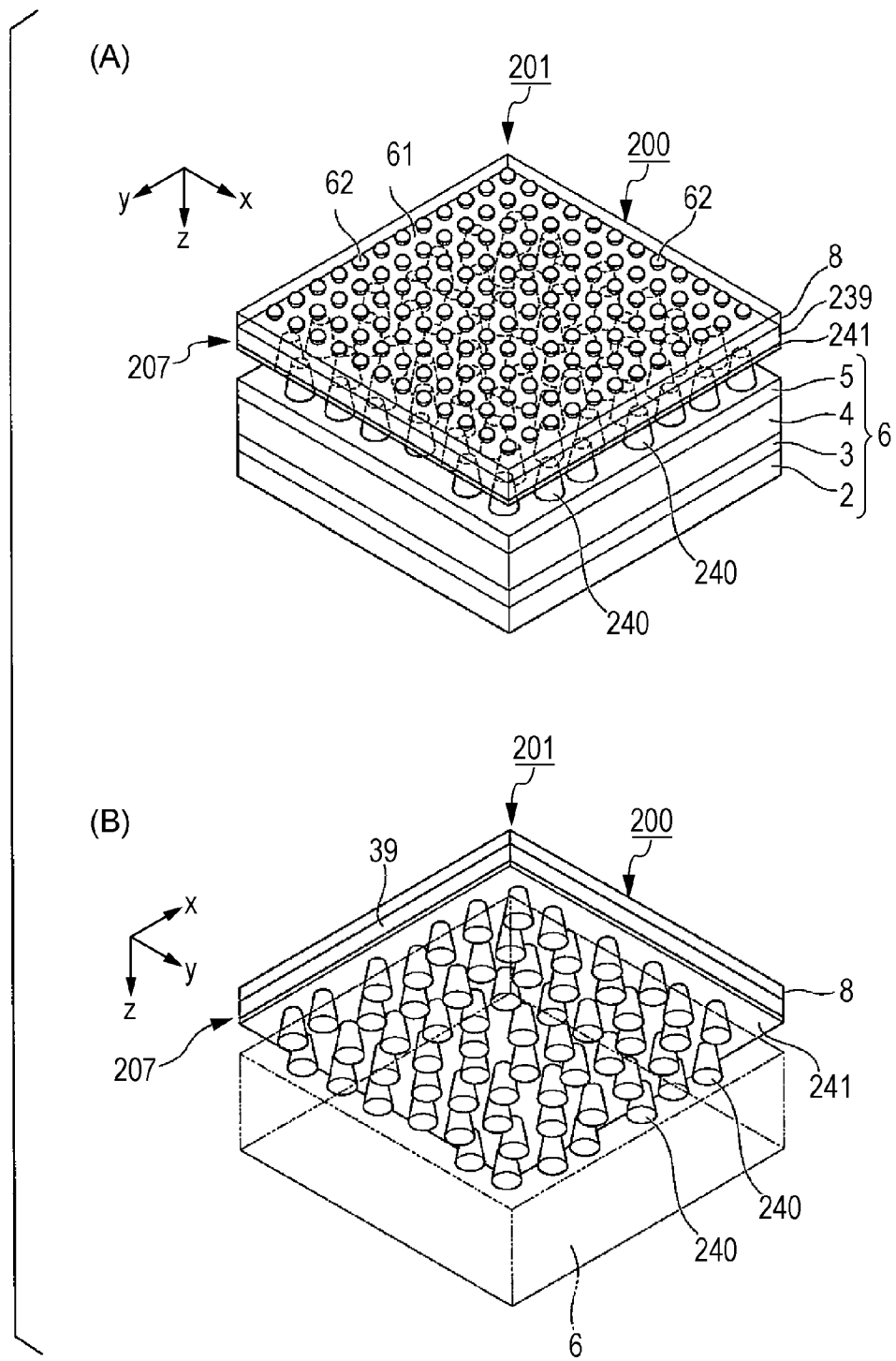
FIG. 8 is a schematic configuration diagram of a liquid crystal display device that is described as a second embodiment of the present invention.

FIG. 8(A) is a perspective view of the liquid crystal display device 201 as seen from above. FIG. 8(B) is a perspective view of the liquid crystal display device 201 as seen from below.

The liquid crystal display device 201 illustrated in FIGS. 8(A) and (B) basically has the same configuration as the liquid crystal display device 1, except inclusion of a light diffusion member 200 with the antiglare layer in a different configuration from the light diffusion member 100 with the antiglare layer. Thus, a configuration of the light diffusion member 200 with the antiglare layer will be described in the description made below. Further, components equivalent to the liquid crystal display device 1 and the light diffusion member 100 with the antiglare layer will not be described and will be given the same reference characters in the drawings.

(Light Diffusion Member with Antiglare Layer)

Next, a specific configuration of the light diffusion member 200 with the antiglare layer will be described with reference to FIGS. 9(A) to (C).

Figure 9:
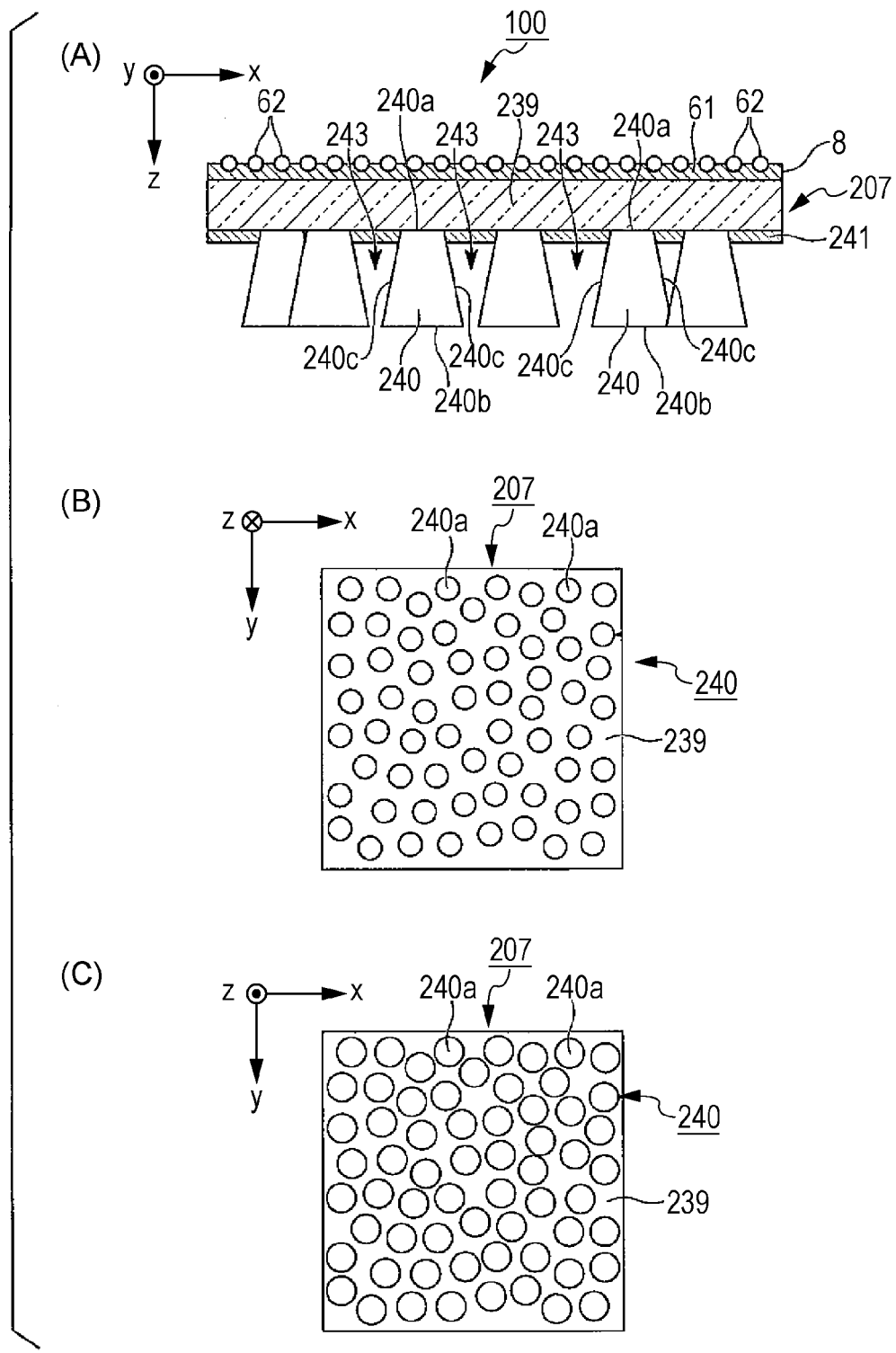
FIG. 9 is a schematic configuration diagram of a light diffusion member with the antiglare layer that is included in the liquid crystal display device according to the second embodiment.

FIG. 9(A) is a cross-sectional view that illustrates a schematic configuration of the light diffusion member 200 with the antiglare layer. FIG. 9(B) is a plan view of the light diffusion member 200 with the antiglare layer as seen from the viewing side. FIG. 9(C) is a plan view of the light diffusion member 200 with the antiglare layer as seen from the back side. Further, an x axis illustrated in FIGS. 9(A) to (C) indicates the horizontal direction of the screen of the liquid crystal panel 4, a y axis indicates the vertical direction of the screen of the liquid crystal panel 4, and a z axis indicates the thickness direction of the liquid crystal display device 201.

As illustrated in FIGS. 9(A) to (C), the light diffusion member 200 with the antiglare layer is formed of the light diffusion member 207 that is integrally formed with the antiglare layer 8.

The light diffusion member 207 includes a substrate 239 having optical transparency, plural light diffusion portions 240 formed on one surface (the surface on the opposite side to the viewing side) of the substrate 239, and a light shielding layer (light absorption portion) 241 and has a configuration in which the light diffusion portions 240 are separately arranged in plural regions in a region in which the light shielding layer 241 is formed. That is, the light diffusion member 200 with the antiglare layer has a configuration in which the formation regions of the light diffusion portion 40 and light shielding portions 41, which are included in the light diffusion member 100 with the antiglare layer, are inverted.

For example, transparent resin films such as a triacetylcellulose (TAC) film, and polyethylene terephthalate (PET), polycarbonate (PC), polyethylene naphthalate (PEN), and polyethersulfone (PES) films are preferably used for the substrate 239. In a manufacturing process, which will be described later, the substrate 239 serves as a foundation onto which the materials of the light shielding layer 241 and the light diffusion portion 240 are later coated and thus has to have heat resistance and mechanical strength to a heat treatment procedure in the manufacturing process. Accordingly, a substrate formed of glass or the like may be used for the substrate 239 other than the substrate formed of a resin. However, the thickness of the substrate 239 is preferably thin to the extent that the heat resistance or the mechanical strength is not impaired. The reason is because the thicker substrate 239 may cause the more blurry display. In this embodiment, a transparent resin film with a thickness of 100 µm is used as one example of the substrate 239. Further, the total light transmittance of the substrate 239 is preferably 90% or higher in accordance with the specification of JIS K7361-1. The total light transmittance of 90% or higher may provide sufficient transparency.

The plural light diffusion portions 240 are portions that contribute to transmission of light in the light diffusion member 207 and arranged at random when seen in the normal direction of a main surface of the substrate 239. The plural light diffusion portion 240 are configured with an organic material that has optical transparency and photosensitivity such as an acrylic resin or an epoxy resin, for example. Further, the total light transmittance of the light diffusion portion 240 is preferably 90% or higher in accordance with the specification of JIS K7361-1. The total light transmittance of 90% or higher may provide sufficient transparency.

The horizontal cross-sectional (xy cross-sectional) shape of each of the light diffusion portions 240 is circular. The area of a surface (referred to as light emission end surface) 240a on the substrate 239 side is small, and the area of a surface (light incident end surface) 240b on the opposite side to the substrate 239 is large. The area of the horizontal cross section gradually expands from the substrate 239 side toward the opposite side to the substrate 239. Accordingly, the light diffusion portion 240 has a truncated cone shape in which a side surface 240c is inclined in an inversely tapered manner from the substrate 239 side toward the opposite side to the substrate 239.

The inclination angle of the side surface 240c of the light diffusion portion 240 (the angle formed between the light incident end surface 240b and the side surface 240c) is approximately 80° as one example. However, the inclination angle of the side surface 240c of the light diffusion portion 240 is not particularly limited as long as the inclination angle is an angle that may sufficiently diffuse the incident light when the light is emitted from the light diffusion member 207.

The light shielding layer 241 blocks (absorbs) light that leaks from the side surface 240c of the light diffusion portion 240 and is integrally formed in the region other than regions where the light diffusion portions 240 are formed, on the surface of the substrate 239 on the side on which the light diffusion portions 240 are formed. The light shielding layer 241 is configured with an organic material that is light-absorbing and photosensitive such as a black resist, as one example. Other than that, a film of metal such as chromium (Cr), a multilayer film of Cr with Cr oxide, or the like may be used for the light shielding layer 241, for example.

The layer thickness of the light shielding layer 241 is configured to be thinner than the height of the light diffusion portion 240 from the light incident end surface 240b to the light emission end surface 240a. In a case of this embodiment, the layer thickness of the light shielding layer 241 is approximately 150 nm as one example, and the height of the light diffusion portion 240 from the light incident end surface 240b to the light emission end surface 240a is approximately 25 µm as one example. Accordingly, a space 243 is formed between the light diffusion portion 240 and the light shielding layer 241, and an air layer is present in the space 243.

It is preferable that the refractive index of the substrate 239 and the refractive index of the light diffusion portion 240 are substantially equivalent. The reason is because, for example, in a case where the refractive index of the substrate 239 is largely different from the refractive index of the light diffusion portion 240, unnecessary refraction or reflection of light occurs at the interface between the light diffusion portion 240 and the substrate 239 when the light that is incident from the light incident end surface 240b is emitted from the light diffusion portion 240, and this may result in problems such as difficulty in obtaining a desired viewing angle and a decrease in the amount of emitted light.

The light diffusion member 200 with the antiglare layer is formed of the light diffusion member 207 that is integrally formed with the antiglare layer 8. That is, the antiglare layer 8 includes the binder layer 61 formed on the other surface of the substrate 39 and the light diffusion particles 62 that are dispersedly arranged in the binder layer 61 and has a structure in which the plural light diffusion particles 62 are dispersedly arranged in a state where those are partially exposed from a surface of the binder layer 61.

Accordingly, in a case where the light diffusion member 200 with the antiglare layer is manufactured by the roll-to-roll (R to R) lamination method, the contact area is reduced by the plural light diffusion particles 62 that are exposed from the surface of the antiglare layer 8, and adhesion of the light diffusion member 200 with the antiglare layer that is wound in a roll may thereby be avoided.

The light diffusion member 200 with the antiglare layer that has the above-described configuration is arranged on the viewing side of the liquid crystal display unit 6. That is, the light diffusion portions 240 are attached to the second polarizer 5 via an adhesion layer (not illustrated) in a state where the antiglare layer 8 on the outermost surface is directed toward the viewing side.

The light diffusion member 200 with the antiglare layer of this embodiment satisfies the relationship of the above expression (1). In a case where the above expression (1) is satisfied, the light diffusion member 200 with the antiglare layer may maintain in-plane uniformity of the light diffusion function while maintaining an anti-adhesion characteristic which is described above. That is, in the light diffusion member 200 with the antiglare layer, a transparent negative resist (photosensitive resin layer) is exposed to light with the light shielding layer 241, which will be described later, serving as a mask, and the transparent negative resist may be irradiated with diffused light that is diffused by the light diffusion particles 62 of the antiglare layer 8 in a procedure of forming the light diffusion portions 240. In addition, in the case where the above expression (1) is satisfied, the diffusion angle of the diffused light may be made uniform in the plane of the antiglare layer 8. As a result, non-uniformity of the taper angle of the side surface 240c that is provided to the light diffusion portion 240 may be suppressed to a low level. Accordingly, the light diffusion member 200 with the antiglare layer may reduce occurrence of non-uniformity of the viewing angle characteristics in attachment to the liquid crystal panel 4.

Further, in the light diffusion member 200 with the antiglare layer, the plural light shielding layers 241 are arranged at random in the plane. Thus, moire due to interference with regular arrangement of the pixels of the liquid crystal panel 4 does not occur, and the display quality may be maintained.

In the liquid crystal display device 201, such a light diffusion member 200 with the antiglare layer is arranged on the viewing side of the liquid crystal display unit 6, and the viewing angle may thereby be widened while the light emitted from the viewing side of the liquid crystal display unit 6 is diffused. Further, because the illumination light from the backlight 2 is diffused by the light diffusion portions 240 and thereafter further scattered by the light diffusion particles 62 of the antiglare layer 8, an effect of further improving the viewing angle characteristics is provided. Further, the viewability of display in a bright place may be enhanced by reducing the reflection of external light that is incident from the viewing side to the liquid crystal display unit 6 on the surface of the antiglare layer 8.

Third Embodiment

Figure 10:
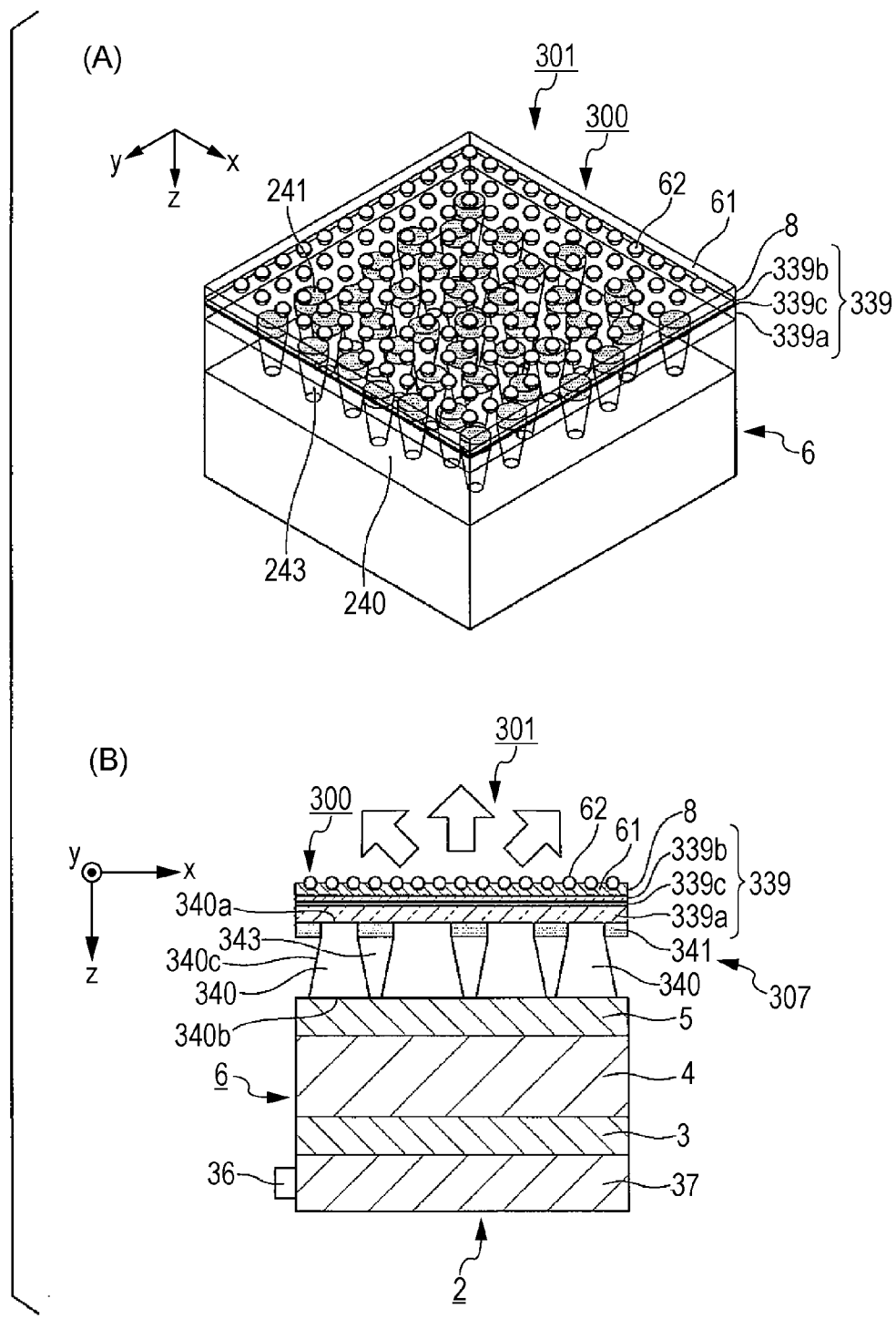
FIG. 10 is a schematic configuration diagram of a liquid crystal display device that is described as a third embodiment of the present invention.

Next, a description will be made about a liquid crystal display device 301 illustrated in FIGS. 10(A) and (B) as a third embodiment. FIG. 10(A) is a perspective view of the liquid crystal display device 301 as seen from above. FIG. 10(B) is a cross-sectional view that illustrates a schematic configuration of the liquid crystal display device 301.
(Liquid Crystal Display Device)

The liquid crystal display device 301 illustrated in FIGS. 10(A) and (B) basically has the same configuration as the liquid crystal display device 1, except inclusion of a light diffusion member 300 with the antiglare layer in a different configuration from the light diffusion member 100 with the antiglare layer. Thus, a configuration of the light diffusion member 300 with the antiglare layer will be described in the description made below. Further, components equivalent to the liquid crystal display device 1 and the light diffusion member 100 with the antiglare layer will not be described and will be given the same reference characters in the drawings.

The light diffusion member 100 with the antiglare layer has a configuration in which the antiglare layer 8 is provided on the other surface of the substrate 39. On the other hand, as illustrated in FIGS. 10(A) and (B), the light diffusion member 300 with the antiglare layer has a configuration in which another substrate on which the antiglare layer 8 is provided is attached to the other surface of the substrate 39 via an adhesion layer.

Specifically, the light diffusion member 300 with the antiglare layer includes a substrate 339 in which one substrate 339a and the other substrate 339b are attached together via an adhesion layer 339c.

On one surface of the one substrate 339a, the plural light diffusion portions 40 are formed, and the light shielding layer 41 is formed in a region other than formation regions of the plural light diffusion portions 40, thereby together configuring the light diffusion member 107.

The antiglare layer 8 is formed on the other surface of the other substrate 339b. The antiglare layer 8 includes the binder layer 61 formed on the other surface of the other substrate 339b and the plural light diffusion particles 62 that are dispersedly arranged in the binder layer 61 and has a structure in which the plural light diffusion particles 62 are dispersedly arranged in a state where those are partially exposed from a surface of the binder layer 61.

The light diffusion member 300 with the antiglare layer that has the above-described configuration is arranged on the viewing side of the liquid crystal display unit 6. That is, light diffusion portions 340 are attached to the second polarizer 5 via an adhesion layer (not illustrated) in a state where the other surface of the substrate 339 is directed toward the viewing side.

The light diffusion member 300 with the antiglare layer of this embodiment satisfies the relationship of the above expression (1). In a case where the above expression (1) is satisfied, in-plane uniformity of the light diffusion function may be maintained. That is, in the light diffusion member 300 with the antiglare layer, a transparent negative resist (photosensitive resin layer) is exposed to light with a light shielding layer 341 serving as a mask, and the transparent negative resist may be irradiated with diffused light that is diffused by the light diffusion particles 62 of the antiglare layer 8 in a procedure of forming the light diffusion portions 340. In addition, in the case where the above expression (1) is satisfied, the diffusion angle of the diffused light may be made uniform in the plane of the antiglare layer 8. As a result, non-uniformity of the taper angle of a side surface 340c that is provided to the light diffusion portion 340 may be suppressed to a low level. Accordingly, the light diffusion member 300 with the antiglare layer may reduce occurrence of non-uniformity of the viewing angle characteristics in attachment to the liquid crystal panel 4.

In the liquid crystal display device 301, such a light diffusion member 300 with the antiglare layer is arranged on the viewing side of the liquid crystal display unit 6, and the viewing angle may thereby be widened while the light emitted from the viewing side of the liquid crystal display unit 6 is diffused. Further, because the illumination light from the backlight 2 is diffused by the light diffusion portions 340 and thereafter further scattered by the light diffusion particles 62 of the antiglare layer 8, an effect of further improving the viewing angle characteristics is provided. Further, the viewability of display in a bright place may be enhanced by reducing the reflection of external light that is incident from the viewing side to the liquid crystal display unit 6 on the surface of the antiglare layer 8.

In the light diffusion member 300 with the antiglare layer, the thickness T in the above expression (1) is the thickness of the substrate 339, which is the combined thickness of the one substrate 339a, the adhesion layer 339c, and the other substrate 339b.

Further, the light diffusion member 300 with the antiglare layer has a configuration in which another substrate on which the antiglare layer 8 is provided is attached to the other surface of the substrate 39, instead of a configuration in which the antiglare layer 8 is provided on the other surface of the substrate 39 in the light diffusion member 100 with the antiglare layer. Accordingly, as a modification example of the light diffusion member 300 with the antiglare layer, the light diffusion member 200 with the antiglare layer may have a configuration in which another substrate on which the antiglare layer 8 is provided is attached to the other surface of the substrate 39, instead of providing the antiglare layer 8 on the other surface of the substrate 39.

Fourth Embodiment

Next, a description will be made about a liquid crystal display device 401 illustrated in FIGS. 11(A) and (B) as a fourth embodiment. FIG. 11(A) is a perspective view of the liquid crystal display device 401 as seen from above. FIG. 11(B) is a cross-sectional view that illustrates a schematic configuration of the liquid crystal display device 401.
(Liquid Crystal Display Device)

The liquid crystal display device 401 illustrated in FIGS. 11(A) and (B) basically has the same configuration as the liquid crystal display device 1, except inclusion of a light diffusion member 400 with an antiglare layer in a different configuration from the light diffusion member 100 with the antiglare layer. Thus, a configuration of the light diffusion member 400 with the antiglare layer will be described in the description made below. Further, components equivalent to the liquid crystal display device 1 and the light diffusion member 100 with the antiglare layer will not be described and will be given the same reference characters in the drawings.

As illustrated in FIGS. 11(A) and (B), the light diffusion member 400 with the antiglare layer has an antiglare layer 408 in a different configuration from the antiglare layer 8 included in the light diffusion member 100 with the antiglare layer. That is, the antiglare layer 408 has a configuration in which plural light diffusion particles 462 are dispersedly arranged in a state where those are embedded on the inside of a binder layer 461. The configuration is basically the same as the light diffusion member 100 with the antiglare layer other than that.

The light diffusion member 400 with the antiglare layer of this embodiment satisfies the relationship of the above expression (1). In a case where the above expression (1) is satisfied, in-plane uniformity of the light diffusion function may be maintained. That is, in the light diffusion member 400 with the antiglare layer, a transparent negative resist (photosensitive resin layer) is exposed to light with the light shielding layer 41 serving as a mask, and the transparent negative resist may be irradiated with diffused light that is diffused by the light diffusion particles 62 of the antiglare layer 8 in a procedure of forming the light diffusion portions 40. In addition, in the case where the above expression (1) is satisfied, the diffusion angle of the diffused light may be made uniform in the plane of the antiglare layer 408. As a result, non-uniformity of the taper angle of the side surface 40c that is provided to the light diffusion portion 40 may be suppressed to a low level. Accordingly, the light diffusion member 400 with the antiglare layer may reduce occurrence of non-uniformity of the viewing angle characteristics in attachment to the liquid crystal panel 4.

In the liquid crystal display device 401, such a light diffusion member 400 with the antiglare layer is arranged on the viewing side of the liquid crystal display unit 6, and the viewing angle may thereby be widened while the light emitted from the viewing side of the liquid crystal display unit 6 is diffused. Further, because the illumination light from the backlight 2 is diffused by the light diffusion portions 40 and thereafter further scattered by the light diffusion particles 462 of the antiglare layer 408, an effect of further improving the viewing angle characteristics is provided. Further, the viewability of display in a bright place may be enhanced by reducing the reflection of external light that is incident from the viewing side to the liquid crystal display unit 6 on the surface of the antiglare layer 408.

Further, the light diffusion member 400 with the antiglare layer has a configuration in which the antiglare layer 408, instead of the antiglare layer 8, is provided on the other surface of the substrate 39 in the light diffusion member 100 with the antiglare layer. Accordingly, as a modification example of the light diffusion member 400 with the antiglare layer, a configuration is possible in which the antiglare layer 408, instead of the antiglare layer 8, is provided on the other surface of the substrate 39 in the light diffusion member 200 with the antiglare layer.

Figure 12:
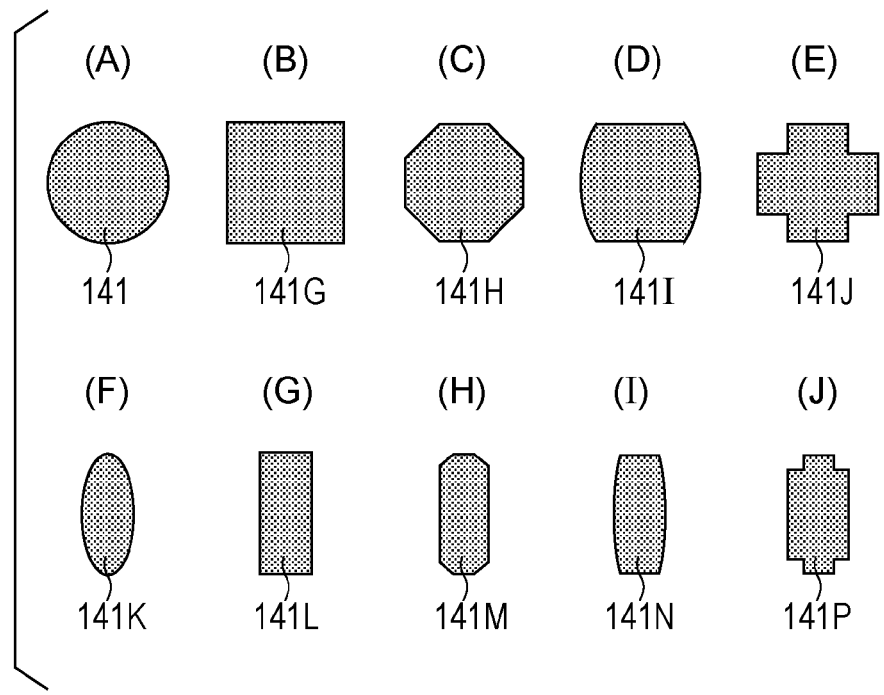
FIG. 12 is a diagram that exemplifies a clear shape of a light shielding layer.

In this embodiment, an example of the light shielding layer 41 whose planar shape is an elliptic shape. However, as illustrated in FIG. 12(A), a light shielding layer 141 whose planar shape is a circle may be used. Alternatively, as illustrated in FIG. 12(B), a light shielding layer 141G whose planar shape is a square may be used. Alternatively, as illustrated in FIG. 12(C), a light shielding layer 141H whose planar shape is a regular octagon may be used. Alternatively, as illustrated in FIG. 12(D), a light shielding layer 141I in a shape in which two opposed sides of a square are curved outward may be used. Alternatively, as illustrated in FIG. 12(E), a light shielding layer 141J in a shape in which two rectangles cross in two orthogonal directions may be used. Alternatively, as illustrated in FIG. 12(F), a light shielding layer 141K in an elongated elliptic shape may be used. Alternatively, as illustrated in FIG. 12(G), a light shielding layer 141L in an elongated rectangular shape may be used. Alternatively, as illustrated in FIG. 12(H), a light shielding layer 141M in an elongated octagonal shape may be used. Alternatively, as illustrated in FIG. 12(I), a light shielding layer 141N in a shape in which two opposed sides of an elongated rectangle are curved outward may be used. Alternatively, as illustrated in FIG. 12(J), a light shielding layer 141P in a shape in which two rectangles in different aspect ratios cross in two orthogonal directions may be used. In addition, the shapes of FIGS. 12(A) to (J) may be rotated in plural directions.

In the circular light shielding layer 141 illustrated in FIG. 12(A), the cross-sectional shape of the side surface of the light diffusion portion is a circle. Accordingly, the light reflected by the side surface of the light diffusion portion is diffused in all directions of 360 degrees. Differently, in the square light shielding layer 141G illustrated in FIG. 12(B), for example, light is diffused in the perpendicular directions to the sides of the square. Further, in the light shielding layer 141L in the rectangular shape, which is illustrated in FIG. 12(G), the light diffusion in the perpendicular direction to the long sides is more intense than the light diffusion in the perpendicular direction to the short sides. Thus, a light diffusion sheet in which the intensities of light diffusion are different between the vertical direction (up-down direction) and the horizontal direction (left-right direction) in accordance with the lengths of the sides may be realized. Further, in the octagonal light shielding layer 141H illustrated in FIG. 12(C), light diffusion may be concentrated into the vertical direction, the horizontal direction, and the oblique direction at 45 degrees, viewing angle characteristics of which are regarded as important particularly in the liquid crystal display device. In a case where anisotropy of the viewing angles are desired as described above, different light diffusion characteristics may be obtained by appropriately changing the shape of a light shielding portion.

{Fifth Embodiment}

(Liquid Crystal Display Device)

Next, a description will be made about a liquid crystal display device 501 illustrated in FIG. 13 as a fifth embodiment.

Figure 13:
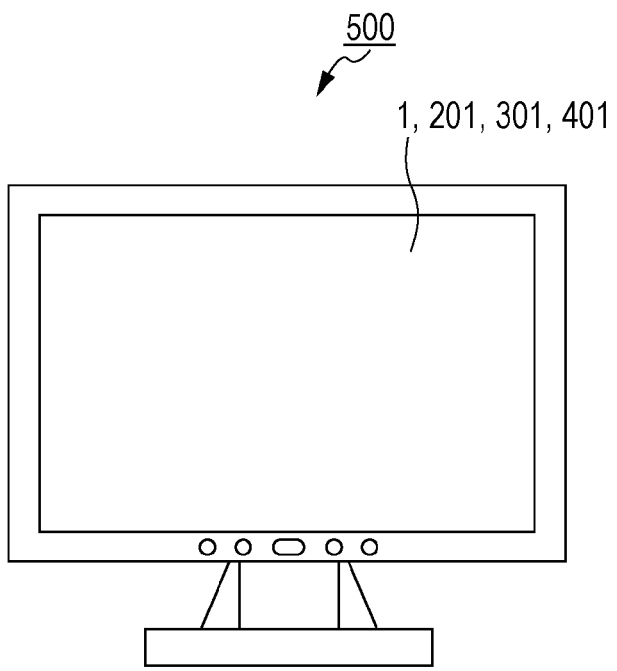
FIG. 13 is a schematic configuration diagram of a liquid crystal display device that is described as a fifth embodiment of the present invention.

FIG. 13 is a front view that illustrates a schematic configuration of a liquid crystal display device as one configuration example of a display device.

The liquid crystal display device 501 illustrated in FIG. 13 is a liquid crystal television and becomes a liquid crystal television with high image quality by including the liquid crystal display device 1, 201, 301, or 401 of the above embodiment.

The liquid crystal display devices 1, 201, 301, and 401 of the embodiments are not limited to such a television but may be applied to display portions of personal computers, cellular phones, and so forth, for example.

It should be noted that the present invention is not necessarily limited to the above embodiments but various modifications may be applied within the scope that does not depart from the gist of the present invention.

For example, in the above embodiments, examples of the liquid crystal display devices that include the liquid crystal panel 4 as a display unit are raised. However, embodiments are not limited to those, but the present invention may be applied to display devices that include an organic electroluminescence (EL) element, a plasma display, and so forth as a display unit.

Further, in the above embodiments, examples are described where the light diffusion members 100, 200, 300, and 400 with the antiglare layer are attached onto the second polarizer 5 of the liquid crystal display unit 6. However, the light diffusion member 100, 200, 300, or 400 does not necessarily have to contact with the liquid crystal display unit 6. For example, another optical film, optical component, or the like may be inserted between the light diffusion members 100, 200, 300, and 400 and the liquid crystal display unit 6. Alternatively, the light diffusion members 100, 200, 300, and 400 may be in a separated position from the liquid crystal display unit 6. Further, because a polarizer does not have to be provided in cases of an organic electroluminescence display device, a plasma display, and so forth, the light diffusion member 100, 200, 300, or 400 does not contact with the polarizer.

Further, a configuration is possible in which at least one of an anti-reflection layer, a polarizing filter layer, an antistatic layer, and a layer to which an anti-fouling treatment is applied, for example, other than the antiglare layer is provided on the viewing side of the substrate 39 of the light diffusion member 100, 200, 300, or 400 with the antiglare layer in the above embodiment. Such a configuration may add a function of reducing reflection of external light, a function of avoiding adhesion of dust and dirt, a function of avoiding dents, and so forth in accordance with the kind of layer provided on the viewing side of the substrate 39 and may avoid time degradation of the viewing angle characteristics.

In addition, a specific configuration related to dimensions and materials of components of the light diffusion member, manufacturing conditions in the manufacturing process, and so forth are not limited to the above embodiments but may appropriately be changed.

INDUSTRIAL APPLICABILITY

The present invention may be applied to displays and so forth of portable electronic apparatuses such as cellular phones, televisions, personal computers, and so forth.

REFERENCE SIGNS LIST 1, 201, 301, 401, 501 liquid crystal display device (display device)
6 liquid crystal display unit (display unit)
7, 107, 207, 307 light diffusion member
8, 408 antiglare layer
39, 339 substrate
39A substrate sheet
339$a$ one substrate
339$b$ other substrate
339$c$ adhesion layer
40, 240, 340 light diffusion portion
40$a$, 240$a$, 340$a$ light emission end surface
40$b$, 240$b$, 340$b$ light incident end surface
40$c$, 240$c$, 340$c$ side surface
41, 241, 341 light shielding layer
243, 343 air-cavity
61, 461 binder layer
62, 462 light diffusion particle
100, 200, 300, 400 light diffusion member with antiglare layer
100A, 200A intermediate body

The invention claimed is:
1. A light diffusion member comprising:
a substrate that has optical transparency;
one or more light diffusion portions that are located on one surface of the substrate;
one or more light shielding layers that are defined with a thickness less than the height of the one or more light diffusion portions in another region of the one surface of the substrate than the one or more light diffusion portions; and
an antiglare layer that is defined on the other surface of the substrate, wherein
the one or more light diffusion portions include a light emission end surface that contacts with the substrate, a light incident end surface that faces the light emission end surface and has a larger area than an area of the light emission end surface, and a side surface that is defined between the light emission end surface and the light incident end surface,
the antiglare layer includes a binder layer and plural light diffusion particles that are dispersedly arranged in the binder layer, and
in a cross section surface of the light diffusion member, an average value of distances between centers of arbitrary neighboring light diffusion particles among the light diffusion particles is $D_{AVE}$, an average value of distances between centers of arbitrary neighboring light diffusion portions among the one or more light diffusion portions is $d_{AVE}$, an angle that the side surface defines with respect to the light incident end surface is $\theta$, a thickness of the substrate is T, and a relationship of $D_{AVE} - 2T/\tan\theta \le d_{AVE}$ is satisfied.
2. The light diffusion member according to claim 1, wherein the light diffusion particles are arranged in a state where the light diffusion particles are partially exposed from a surface of the binder layer.

3. The light diffusion member according to claim 1, wherein the light diffusion particles are arranged in a state where the light diffusion particles are embedded in the binder layer.

4. The light diffusion member according to claim 1, comprising a structure in which the substrate includes a first substrate that defines the one surface and a second substrate that defines the other surface, and the first substrate and the second substrate are attached together via an adhesion layer.

5. The light diffusion member according to claim 1, comprising a structure in which the one or more light diffusion portions are separately arranged in a first region of a plurality of regions and the one or more light shielding layers are integrally defined in a second region of the plurality of regions.

6. The light diffusion member according to claim 1, comprising a structure in which the one or more light shielding layers are separately arranged in a first region of a plurality of regions and the one or more light diffusion portions are integrally defined in a second region of the plurality of regions.

7. A display device comprising:
a display; and
a light diffusion member that is provided on a viewing side of the display and emits light in a state where an angle distribution of light that is incident from the display is made wider than before incidence, wherein the light diffusion member is the light diffusion member according to claim 1.

8. A method for manufacturing a light diffusion member, the method comprising:
a step of fabricating an intermediate body of a light diffusion member in which a light shielding layer that is patterned into a prescribed shape and a photosensitive resin layer that covers a surface on which the light shielding layer is formed are formed on one surface of a substrate that has optical transparency and an antiglare layer that includes a binder layer and plural light diffusion particles which are dispersedly arranged in the binder layer are formed on the other surface of the substrate;
a step of selectively exposing the photosensitive resin layer, by using the light shielding layer as a mask, by irradiating the intermediate body of the light diffusion member with exposure light from a side of the surface on which the antiglare layer is formed; and
a step of forming light diffusion portions that each includes a light emission end surface which contacts with the substrate, a light incident end surface which faces the light emission end surface and has a larger area than an area of the light emission end surface, and a side surface which is formed between the light emission end surface and the light incident end surface, by removing a portion of the photosensitive resin layer that is not yet exposed to light, wherein
in a cross-section surface of the light diffusion member, an average value of distances between centers of arbitrary neighboring light diffusion particles among the light diffusion particles is $D_{AVE}$, an average value of distances between centers of arbitrary neighboring light diffusion portions among the light diffusion portions is $d_{AVE}$, an angle that the side surface defines with respect to the light incident end surface is $\theta$, a thickness of the substrate is T, and a relationship of $D_{AVE}-2T/\tan\theta \leq d_{AVE}$ is satisfied.

9. The method for manufacturing the light diffusion member according to claim 8, wherein while a long substrate sheet on which the antiglare layer is in advance formed on the other side of the substrate is carried, treatments of the steps are performed for the substrate sheet.

* * * * *